(12) United States Patent
Iwashita et al.

(10) Patent No.: US 12,398,535 B2
(45) Date of Patent: Aug. 26, 2025

(54) TURNING UNIT OF CONSTRUCTION MACHINE

(71) Applicant: KOBELCO CONSTRUCTION MACHINERY CO., LTD., Hiroshima (JP)

(72) Inventors: Hidekazu Iwashita, Hyogo (JP); Kenichi Terauchi, Hiroshima (JP); Masatsugu Hamasaki, Hiroshima (JP); Takamasa Abe, Hiroshima (JP); Yoshiki Kamon, Hyogo (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 167 days.

(21) Appl. No.: 18/259,424

(22) PCT Filed: Dec. 16, 2021

(86) PCT No.: PCT/JP2021/046465
§ 371 (c)(1),
(2) Date: Jun. 27, 2023

(87) PCT Pub. No.: WO2022/149429
PCT Pub. Date: Jul. 14, 2022

(65) Prior Publication Data
US 2024/0318406 A1    Sep. 26, 2024

(30) Foreign Application Priority Data

Jan. 6, 2021 (JP) .................................. 2021-000855

(51) Int. Cl.
*B66C 23/00*    (2006.01)
*B66C 23/84*    (2006.01)
(Continued)

(52) U.S. Cl.
CPC .............. *E02F 9/128* (2013.01); *B66C 23/84* (2013.01); *E02F 9/126* (2013.01); *F16D 55/40* (2013.01); *F16D 2121/04* (2013.01)

(58) Field of Classification Search
CPC ....... B66C 23/84; B66C 23/86; B66C 23/163; B66C 2700/0342; B66C 2700/0371
See application file for complete search history.

(56) References Cited

U.S. PATENT DOCUMENTS 3,539,053 A * 11/1970 Hefferin ................ F16D 55/228
192/225
2008/0029354 A1 2/2008 Yoshimatsu et al.
(Continued)

FOREIGN PATENT DOCUMENTS

CN    103080589 A  *  5/2013  ............. B66C 23/84
CN    103097759 A  *  5/2013  ............. B60T 1/062
(Continued)

OTHER PUBLICATIONS

Extended European Search Report issued Apr. 16, 2024 in European Patent Application No. 21917650.0, 6 pages.
(Continued)

*Primary Examiner* — Emmanuel M Marcelo
(74) *Attorney, Agent, or Firm* — Oblon, McClelland, Maier & Neustadt, L.L.P.

(57) ABSTRACT

Formed inside a housing of a slewing unit are: an upper outer space located outside a piston in the radial direction, and at least one supply passage that guides, inward in the radial direction, a lubricant that has passed through a lower space, an outer passage, and an upper outer space in this order, to the lubricant to a plurality of brake members located below the piston. The plurality of brake members are disposed above a speed reducer and receive pressing force
(Continued)

from the piston to brake the rotation of a rotation shaft before the rotation is decelerated by the speed reducer.

13 Claims, 14 Drawing Sheets

(51) Int. Cl.
  *E02F 9/12* (2006.01)
  *F16D 55/40* (2006.01)
  *F16D 121/04* (2012.01)

(56) References Cited

U.S. PATENT DOCUMENTS

2015/0099604 A1  4/2015  Hamasaki et al.
2015/0126319 A1  5/2015  Hamasaki et al.

FOREIGN PATENT DOCUMENTS

| DE | 10025693 A1 * | 11/2001 | ............ B66C 23/86 |
| DE | 202012009167 U1 * | 2/2014 | ............ B66C 23/02 |
| EP | 2 540 916 A1 | 1/2013 | |
| EP | 2843264 A1 * | 3/2015 | ............ B60T 1/062 |
| GB | 2140086 A * | 11/1984 | ............ B60T 13/22 |
| JP | 2006-25580 A | 1/2006 | |
| JP | 4608384 B2 | 1/2011 | |
| JP | 2011-21 4586 A | 10/2011 | |
| JP | 2013-227798 A | 11/2013 | |
| JP | 2013-228055 A | 11/2013 | |
| JP | 6276782 B2 * | 2/2018 | ............ B66C 23/84 |
| KR | 10-2004-0055954 A | 6/2004 | |

OTHER PUBLICATIONS

International Search Report Issued Mar. 8, 2022, in PCT/JP2021/046465, filed on Dec. 16, 2021, 2 pages.

* cited by examiner

TURNING UNIT OF CONSTRUCTION MACHINE

TECHNICAL FIELD

The present disclosure relates to a slewing unit of a construction machine.

BACKGROUND ART

A construction machine, such as a crane, includes a slewing unit for slewing an upper slewing body mounted on a machine body with respect to the machine body. This slewing unit includes a speed reducer that decelerates the rotation of a slewing motor, and a brake mechanism. The speed reducer decelerates the rotation of the slewing motor to increase driving torque, and transmits the rotational force to a pinion (output shaft).

For example, the speed reducer of the slewing unit in Patent Literatures 1 to 3 is a three-stage planetary speed reducer, and includes a first deceleration portion connected to a slewing motor, a second deceleration portion connected to the first deceleration portion, and a third deceleration portion connected to the second deceleration portion. The brake mechanism includes a plurality of brake members (plurality of brake plates) located between the first deceleration portion and the second deceleration portion, and brakes the rotation after being decelerated by the first deceleration portion. These first deceleration portion, the plurality of brake plates, the second deceleration portion, and the third deceleration portion are accommodated in a cylindrical housing in this order. A lubricant is stored in the housing.

Normally, the lubricant is stored up to the height of the first deceleration portion, or the height of the top deceleration portion in the housing. With this configuration, lubrication of all the deceleration portions and lubrication of the plurality of brake plates located between the first deceleration portion and the second deceleration portion are performed.

In that connection, there is a case where a breather having functions such as intake, exhaust, and air filter is attached at the upper portion of the housing of the slewing unit. In this case, to prevent the lubricant in the housing from leaking out of the breather, it is necessary to secure a certain degree of air volume in the housing. As a means for securing the air volume, for example, increasing the size of the housing can be considered. However, since the slewing unit is required to have a size that does not interfere with various parts arranged around the slewing unit, it is undesirable to increase the size of the housing.

CITATION LIST

Patent Literatures

Patent Literature 1: Japanese Patent No. 4608384
Patent Literature 2: JP 2013-227798 A
Patent Literature 3: JP 2011-214586 A

SUMMARY OF INVENTION

The present disclosure has been made in view of the above-described problem, and an object of the present disclosure is to provide a slewing unit of a construction machine that can secure an appropriate air volume in a housing and appropriately lubricate a speed reducer and brake members while suppressing an increase in the size of the housing.

The provided slewing unit of a construction machine includes: a rotation shaft to which rotational force of a slewing motor is transmitted, the rotation shaft extending in an up-and-down direction; a speed reducer to decelerate rotation of the rotation shaft; a piston located to surround the rotation shaft with a spacing to the rotation shaft outside the rotation shaft in a radial direction, the piston being displaceable in the up-and-down direction; a housing that accommodates the rotation shaft, the speed reducer, and the piston, the housing including a guide portion that is located to surround the piston to guide the piston in the up-and-down direction; and a plurality of brake members that includes: a rotation side brake member that is located to surround the rotation shaft and rotates as the rotation shaft rotates; and a housing side brake member supported by the housing to face the rotation side brake member in the up-and-down direction, the plurality of brake members being located below the piston, in which an upper central space in which at least part of the rotation shaft is disposed, the upper central space being a space surrounded by an inner circumferential surface of the piston; a lower space in which the speed reducer is disposed, the lower space being located below the upper central space; an upper outer space located outside the piston in the radial direction and above the lower space; an outer passage that connects the lower space to the upper outer space; and at least one supply passage that guides, inward in the radial direction, a lubricant that has passed through the lower space, the outer passage, and the upper outer space in this order to supply the lubricant to the plurality of brake members located below the piston are formed in the housing, and the plurality of brake members is disposed above the speed reducer and is configured to brake, by receiving pressing force from the piston, the rotation of the rotation shaft before being decelerated by the speed reducer.

DESCRIPTION OF EMBODIMENT

An embodiment of the present disclosure will be described below with reference to the drawings.

[Construction Machine]

Figure 1:
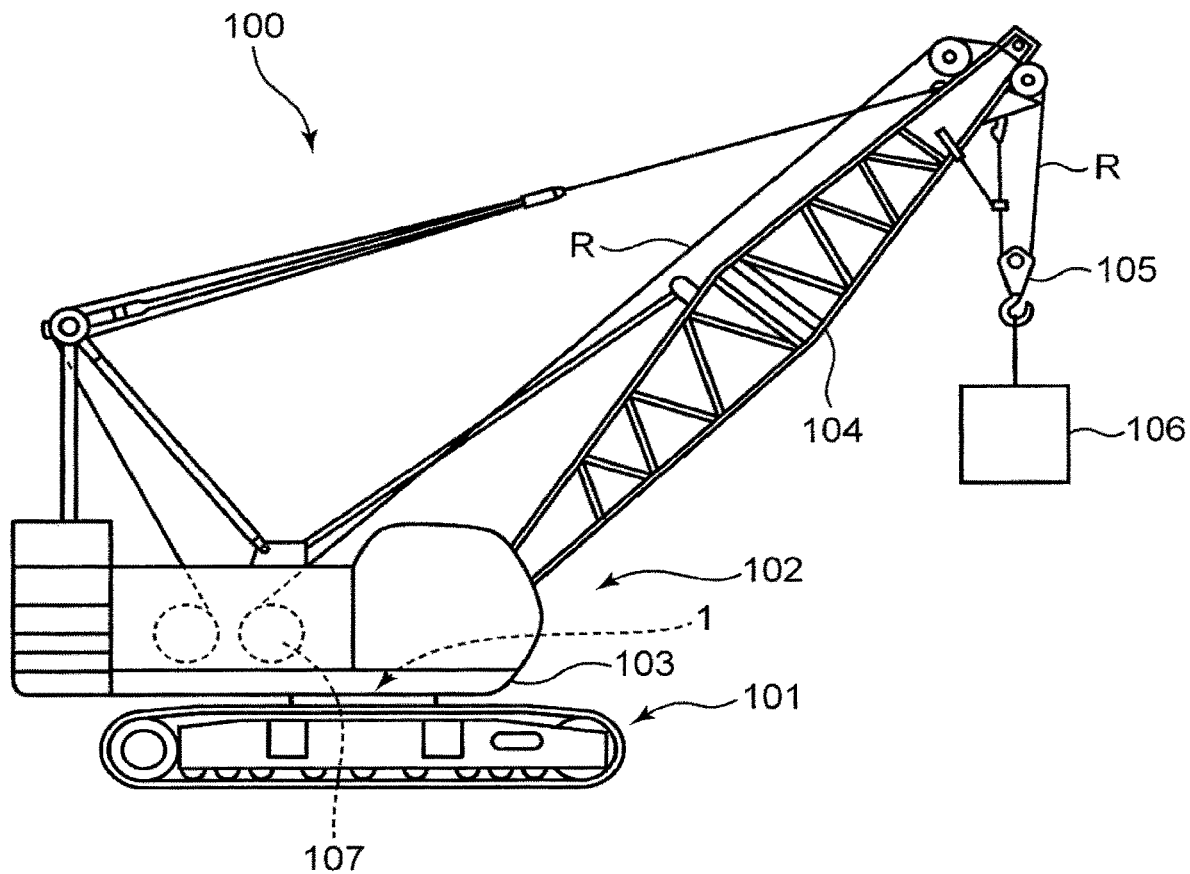
FIG. 1 is a side view showing a construction machine including a slewing unit according to an embodiment.

FIG. 1 is a side view showing a crane 100 including a slewing unit according to the embodiment. The crane 100 is one example of a construction machine. As shown in FIG. 1, the crane 100 includes a self-travelling lower travelling body 101 and an upper slewing body 102 slewably supported on the lower travelling body 101.

The upper slewing body 102 includes a slewing frame 103 mounted on the lower travelling body 101 so as to be slewable about a vertical axis, an attachment 104 attached to the front of the slewing frame 103 so as to be hoisted and lowered, a hook 105 suspended from the tip of the attachment 104 via a rope R (wire rope), a winch device 107, and a slewing drive device 1.

The attachment 104 may include a boom as shown in FIG. 1 and may further include a jib pivotably attached to the distal end of the boom. A hoist load 106 is suspended from the hook 105. The winch device 107 winds up or pays out the rope R connected to the hook 105, thereby causing the hook 105 to perform an up-and-down operation for hoisting work.

[Slewing Drive Device]

Figure 2:
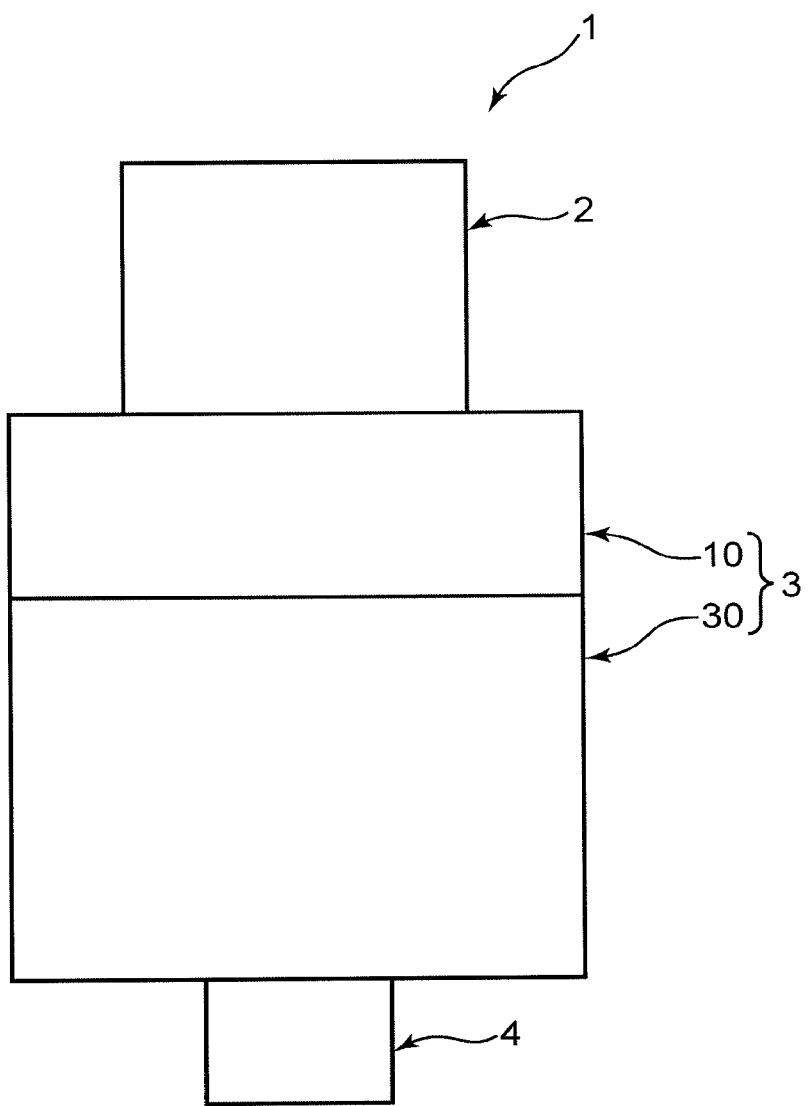
FIG. 2 is a schematic diagram showing a slewing drive device including the slewing unit.

FIG. 2 is a schematic diagram showing the slewing drive device 1 including a slewing unit 3 according to the present embodiment. The slewing drive device 1 is a device for slewing the upper slewing body 102 with respect to the lower travelling body 101. The slewing drive device 1 includes a slewing motor 2, the slewing unit 3, and an output shaft 4.

The slewing motor 2 includes, for example, a motor such as a hydraulic motor or an electric motor. The slewing unit 3 includes a brake mechanism 10 and a speed reducer 30. The speed reducer 30 increases driving torque while decelerating the rotation of the slewing motor 2, and transmits the rotational force to the output shaft 4. The output shaft 4 includes, for example, a pinion, and is disposed to mesh with a slewing ring gear (slewing circle) (not shown). The rotational force of the output shaft 4 is transmitted to the upper slewing body 102 via the slewing ring gear. This allows the upper slewing body 102 to slew about the vertical axis with respect to the lower travelling body 101.

[Slewing Unit]

Figure 3:
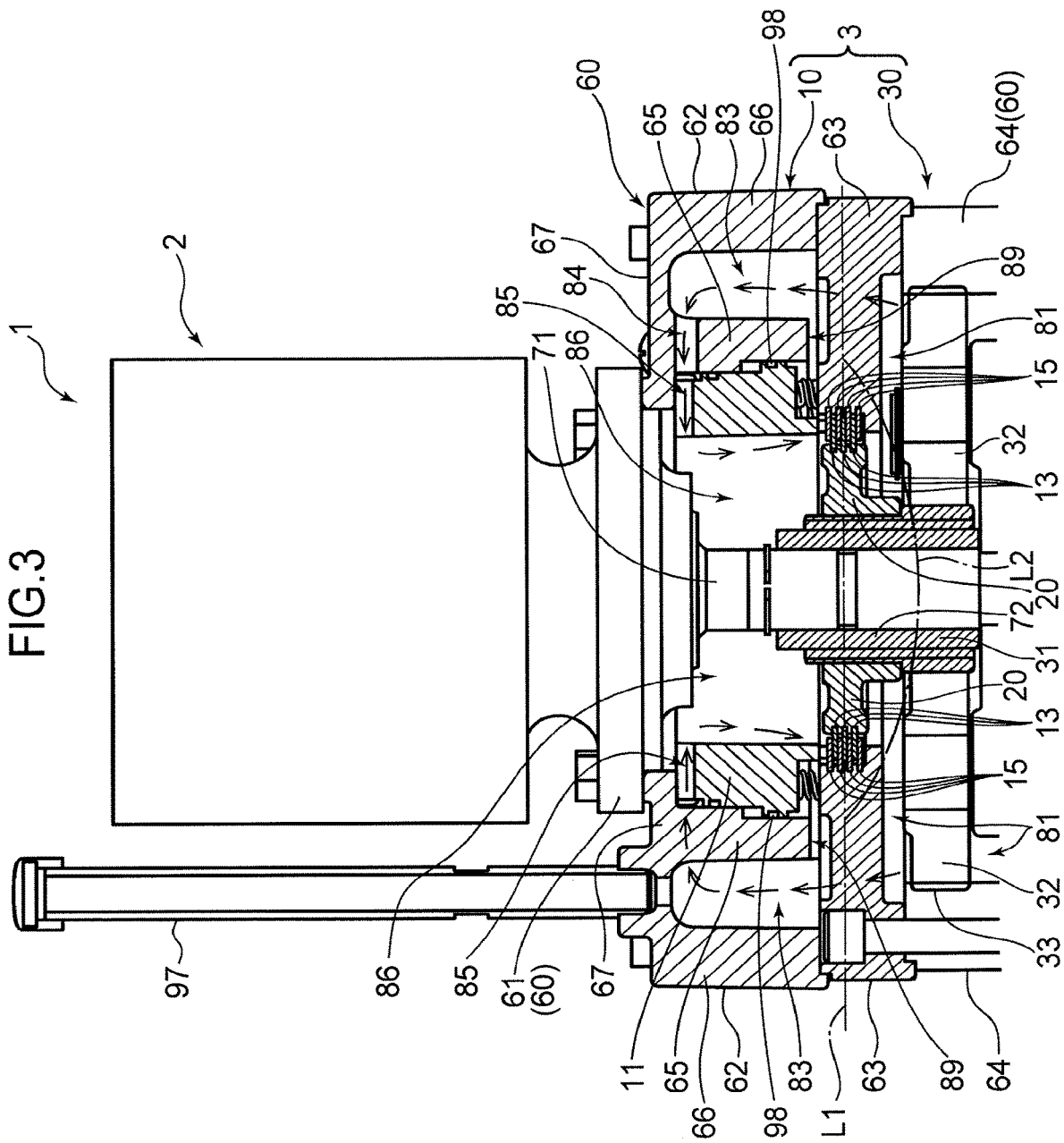
FIG. 3 is a side view showing part of the slewing drive device, and depicts a cross section of part of the slewing unit.

The slewing unit 3 according to the present embodiment will be specifically described below. FIG. 3 is a side view showing part of the slewing drive device 1, and depicts a cross section of part of the slewing unit 3.

The slewing unit 3 includes a rotation shaft 71 to which the rotational force of the slewing motor 2 is transmitted, a rotation member 72, the speed reducer 30, a spider 20, a plurality of brake members 13 and 15, a piston 11, a spring 17, a housing 60, and a breather 97. The piston 11 and the plurality of brake members 13 and 15 constitute the brake mechanism 10 described above. The spring 17 is one example of a biasing member, and the spider 20 is one example of a supporting member.

The rotation shaft 71 is a cylindrical member extending downward from the slewing motor 2, and is connected to the slewing motor 2 such that the rotational force of the slewing motor 2 is transmitted.

The rotation member 72 is a member having a shape surrounding the rotation shaft 71, and is fixed to the rotation shaft 71 to rotate together with the rotation shaft 71. The rotation member 72 includes a spider attachment portion to which the spider 20 is attached and a lower portion 31 located below the spider attachment portion. This lower portion 31 functions as a sun gear 31 to be described later in the speed reducer 30.

The speed reducer 30 includes at least one deceleration portion for decelerating the rotation of the rotation shaft 71. In the present embodiment, the speed reducer 30 includes a plurality of deceleration portions arranged in the up-and-down direction. FIG. 3 shows only the top first deceleration portion. The first deceleration portion includes the sun gear 31, a plurality of planetary gears 32 located around the sun gear 31, and a ring gear 33. In the first deceleration portion, the plurality of planetary gears 32 revolves while rotating, thereby deaccelerating the rotation of the rotation shaft 71. The second deceleration portion located below the first deceleration portion includes a sun gear (not shown) and a plurality of planetary gears (not shown). The rotation decelerated by the first deceleration portion may be further decelerated by the second deceleration portion, and the rotational force may be transmitted to the output shaft 4. In addition, the third deceleration portion may be further located below the second deceleration portion. In this case, the rotation decelerated by the second deceleration portion is further decelerated by the third deceleration portion, and the rotational force is transmitted to the output shaft 4.

Figure 4:
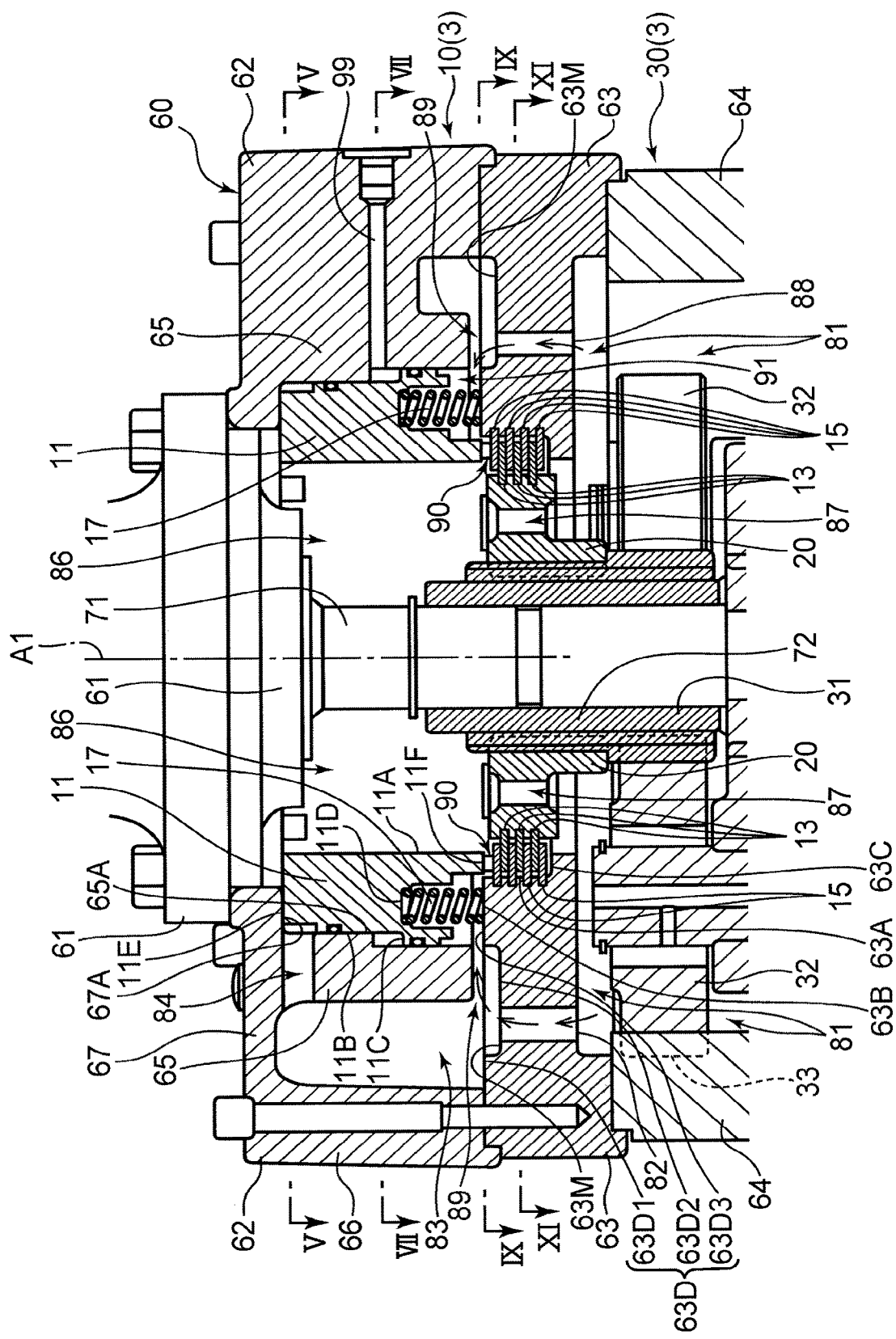
FIG. 4 is a cross-sectional view of the slewing unit, and is a view showing a cross section parallel to a rotation shaft of the slewing unit.
Figure 5:
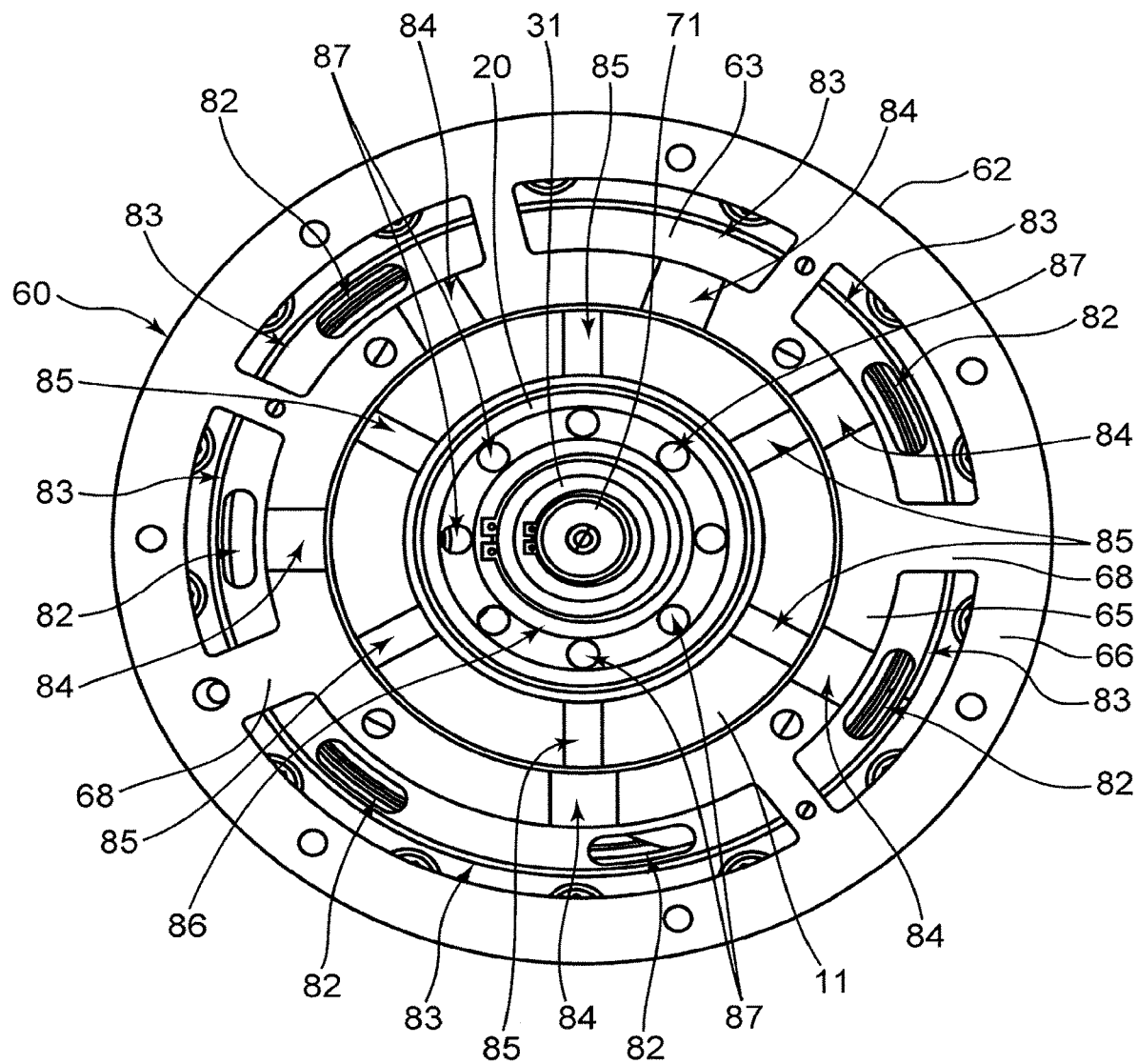
FIG. 5 is a cross-sectional view taken along the line V-V of FIG. 4, and is a view showing a cross section perpendicular to the rotation shaft of the slewing unit.
Figure 6:
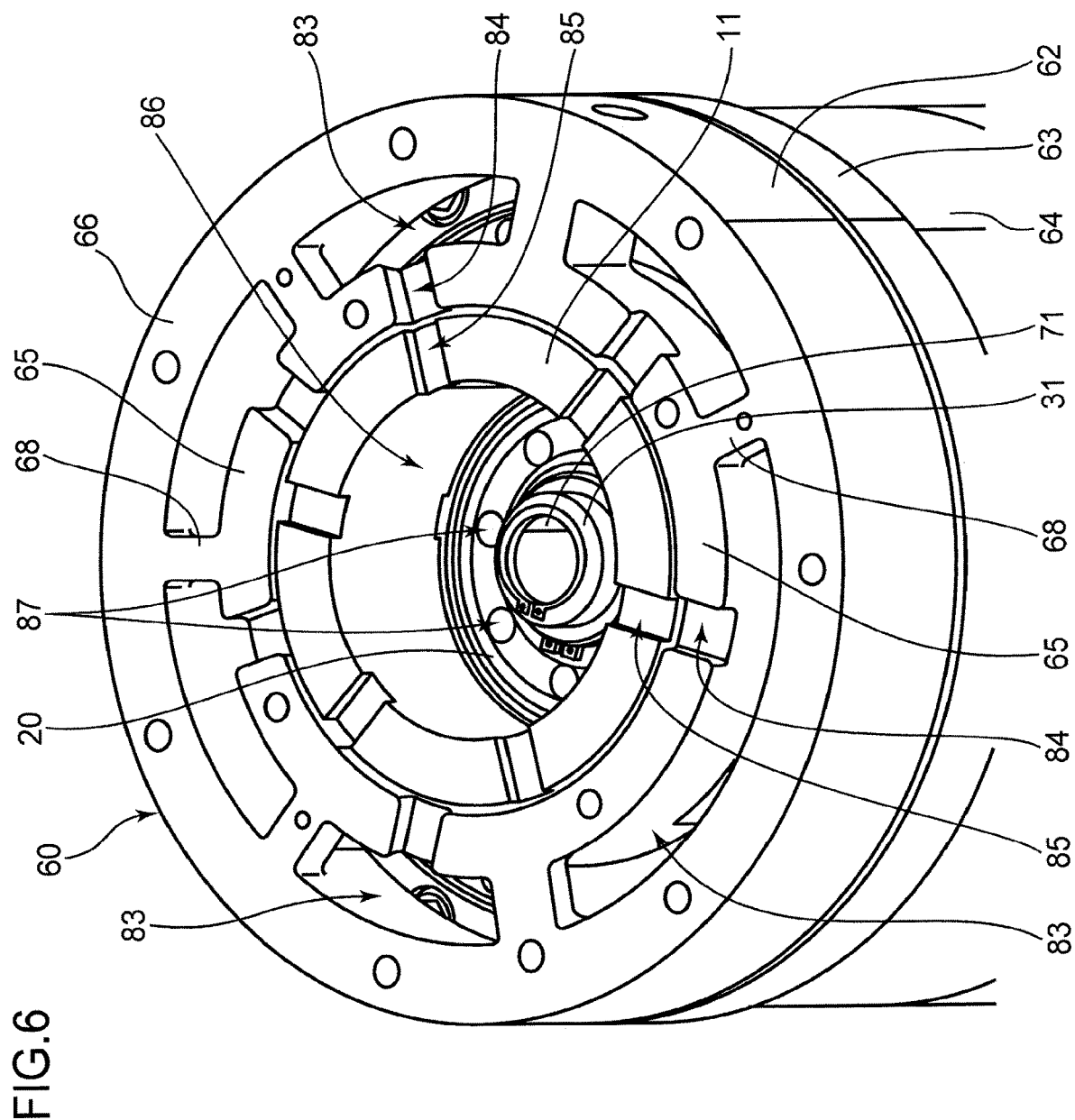
FIG. 6 is a perspective view of the slewing unit cut at the same position as in FIG. 5.
Figure 7:
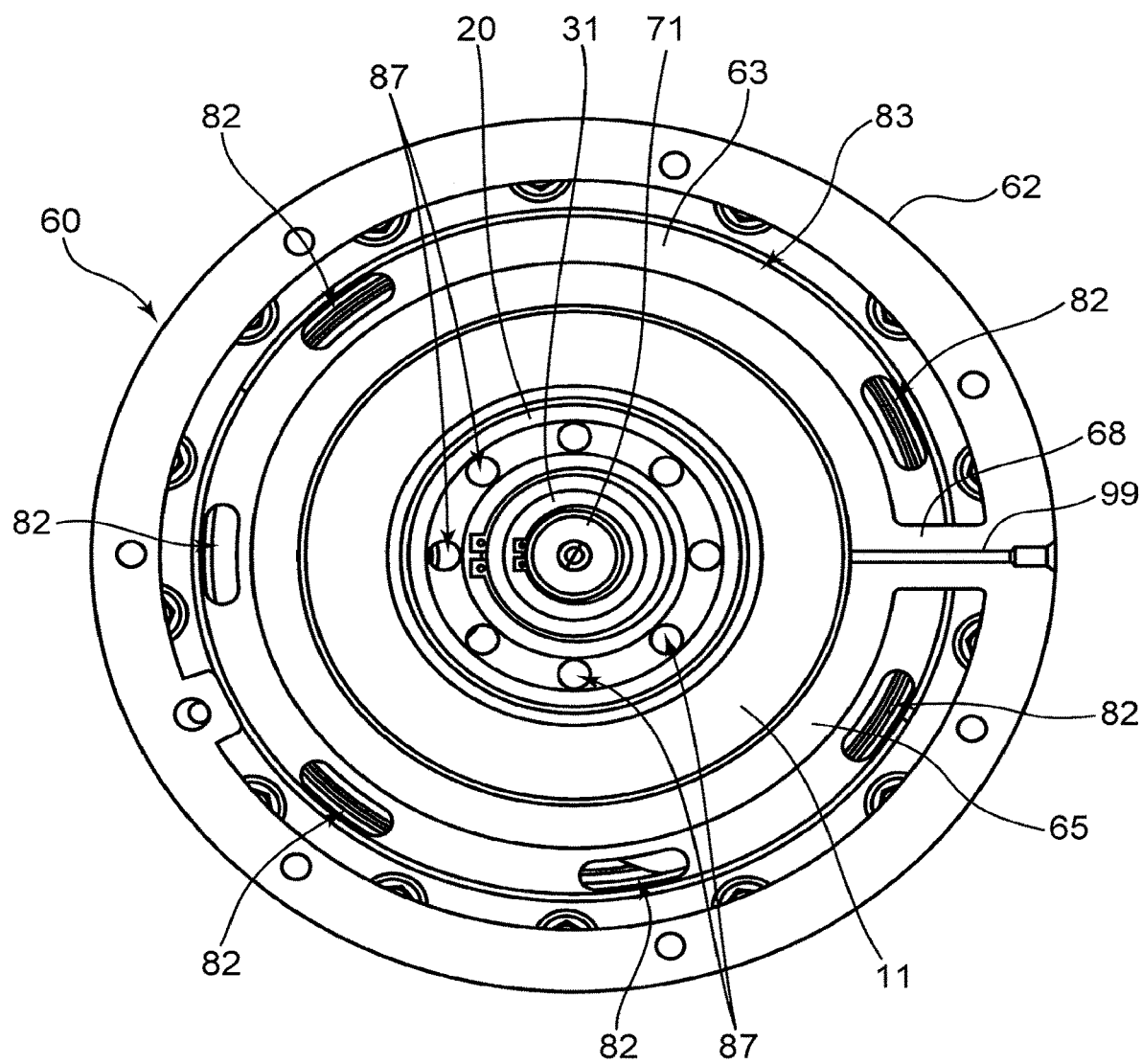
FIG. 7 is a cross-sectional view taken along the line VII-VII of FIG. 4, and is a view showing a cross section perpendicular to the rotation shaft of the slewing unit.
Figure 8:
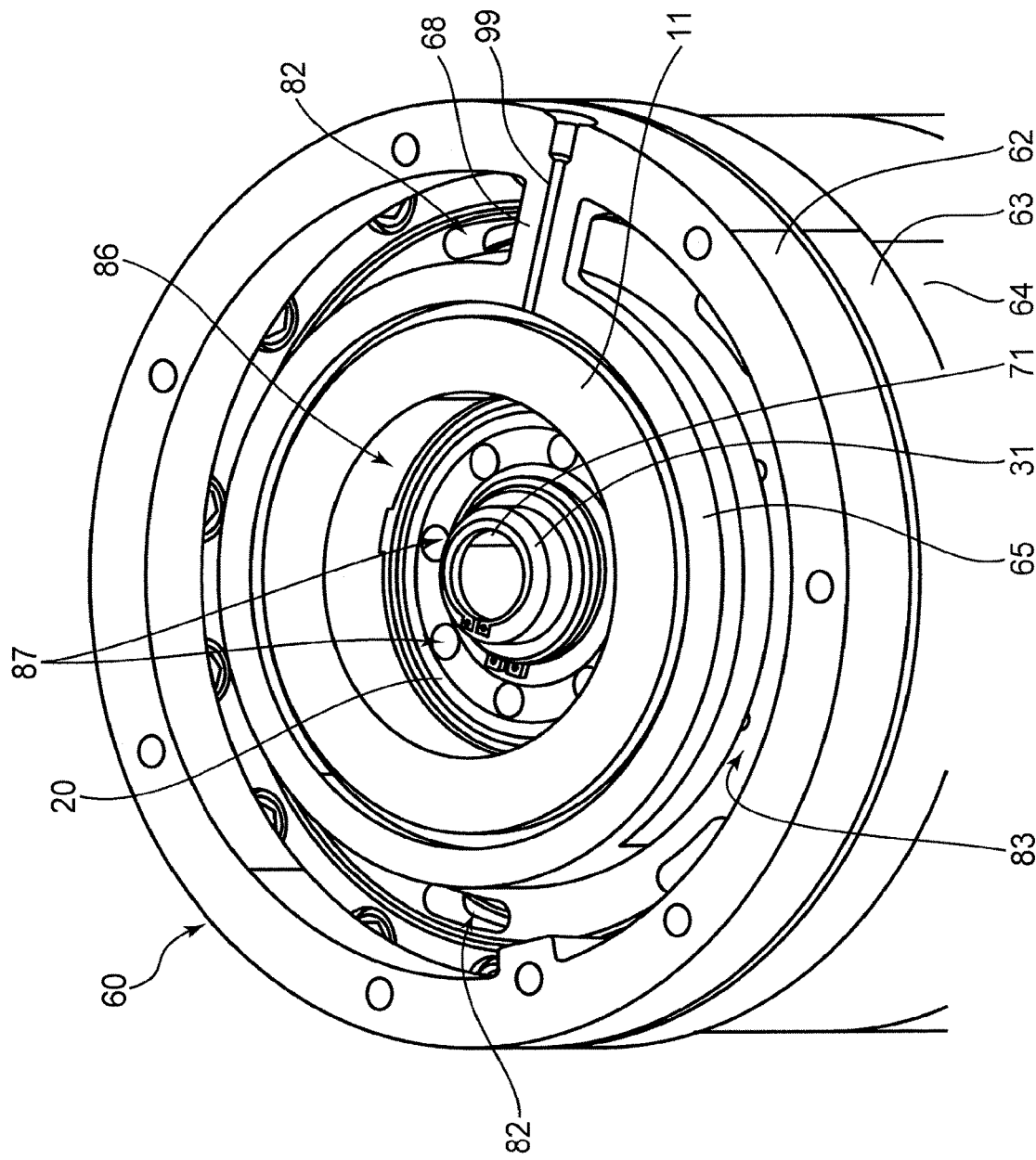
FIG. 8 is a perspective view of the slewing unit cut at the same position as in FIG. 7.
Figure 9:
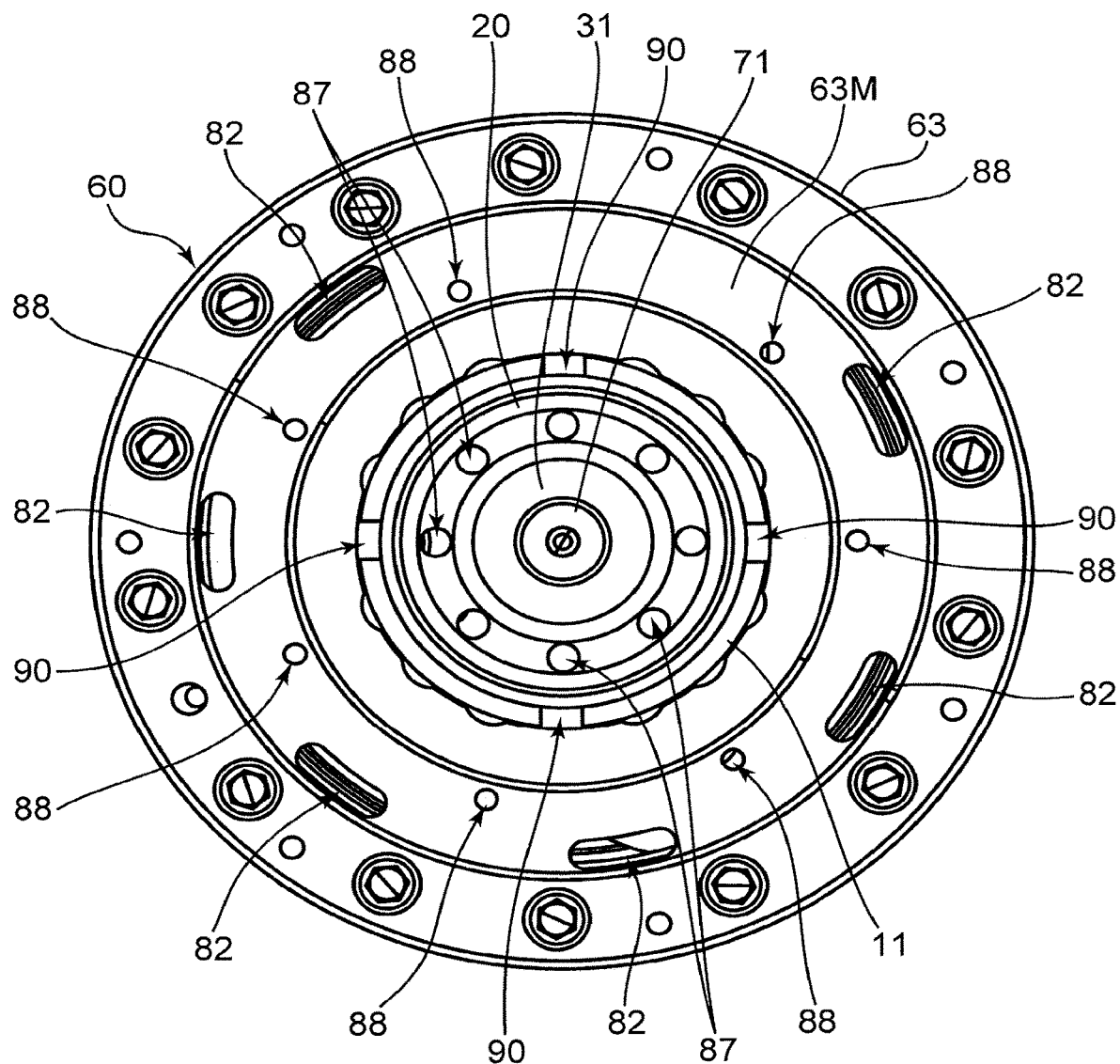
FIG. 9 is a cross-sectional view taken along the line IX-IX of FIG. 4, and is a view showing a cross section perpendicular to the rotation shaft of the slewing unit.
Figure 10:
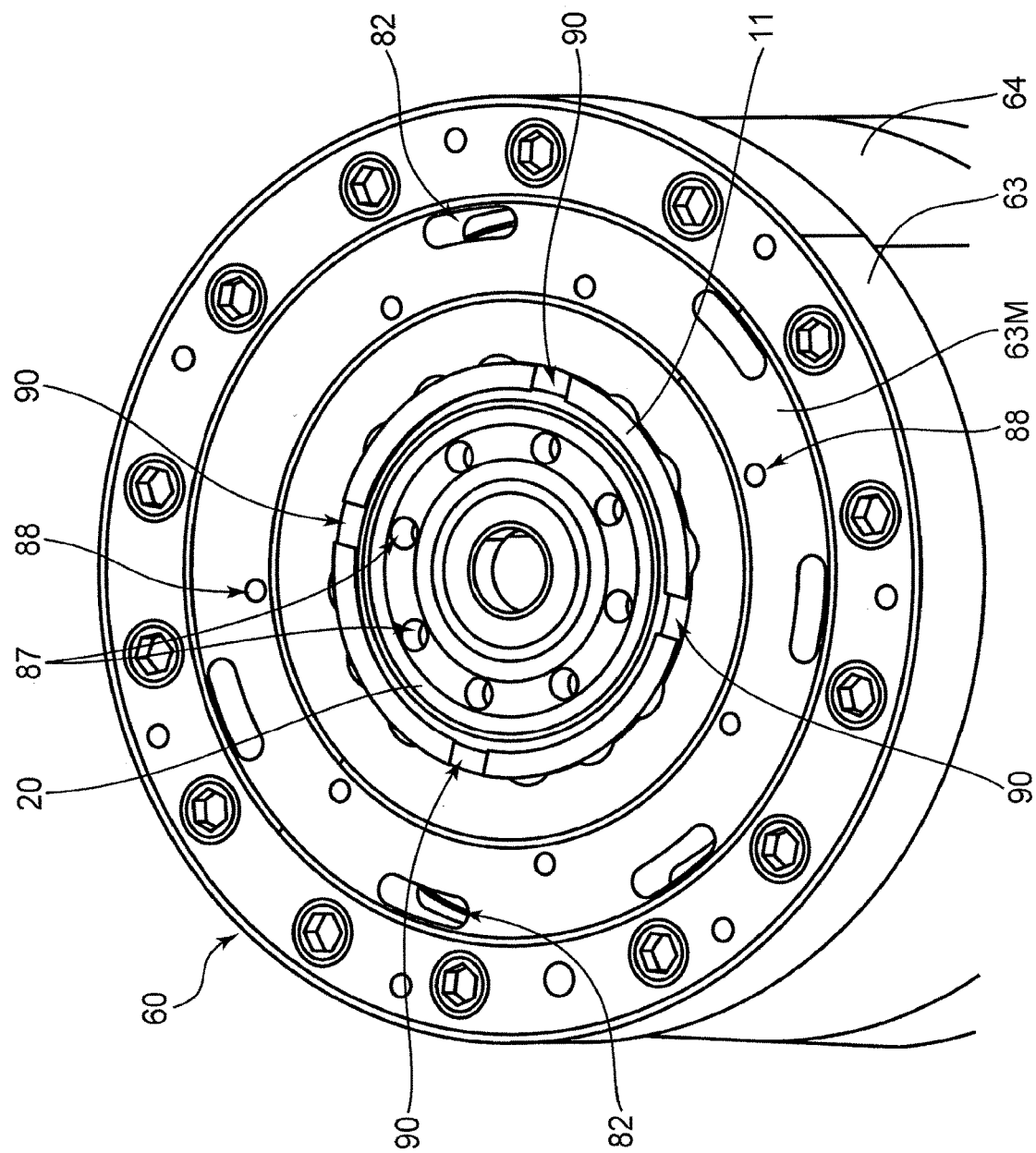
FIG. 10 is a perspective view of the slewing unit cut at the same position as in FIG. 9.
Figure 11:
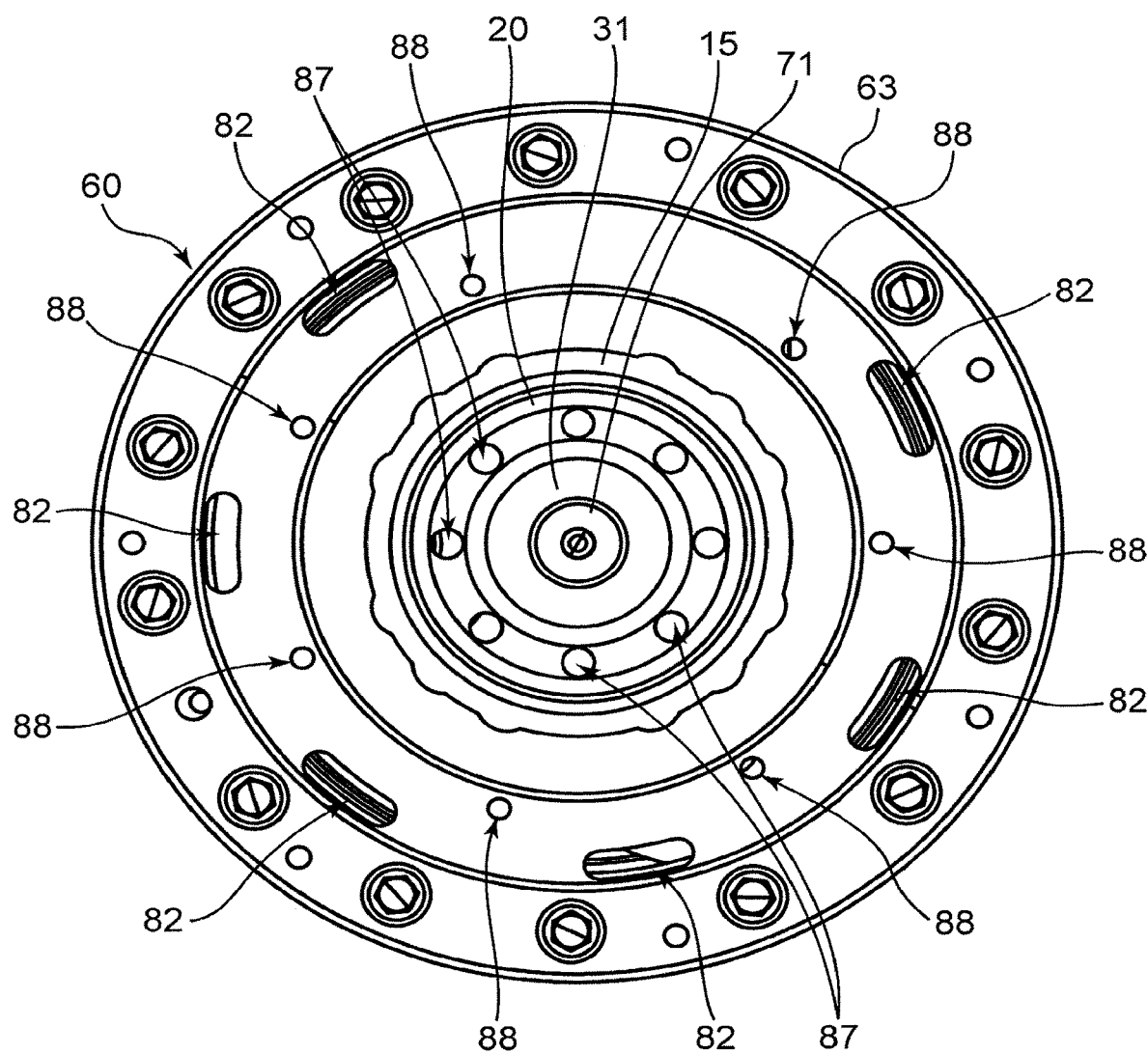
FIG. 11 is a cross-sectional view taken along the line XI-XI of FIG. 4, and is a view showing a cross section perpendicular to the rotation shaft of the slewing unit.
Figure 12:
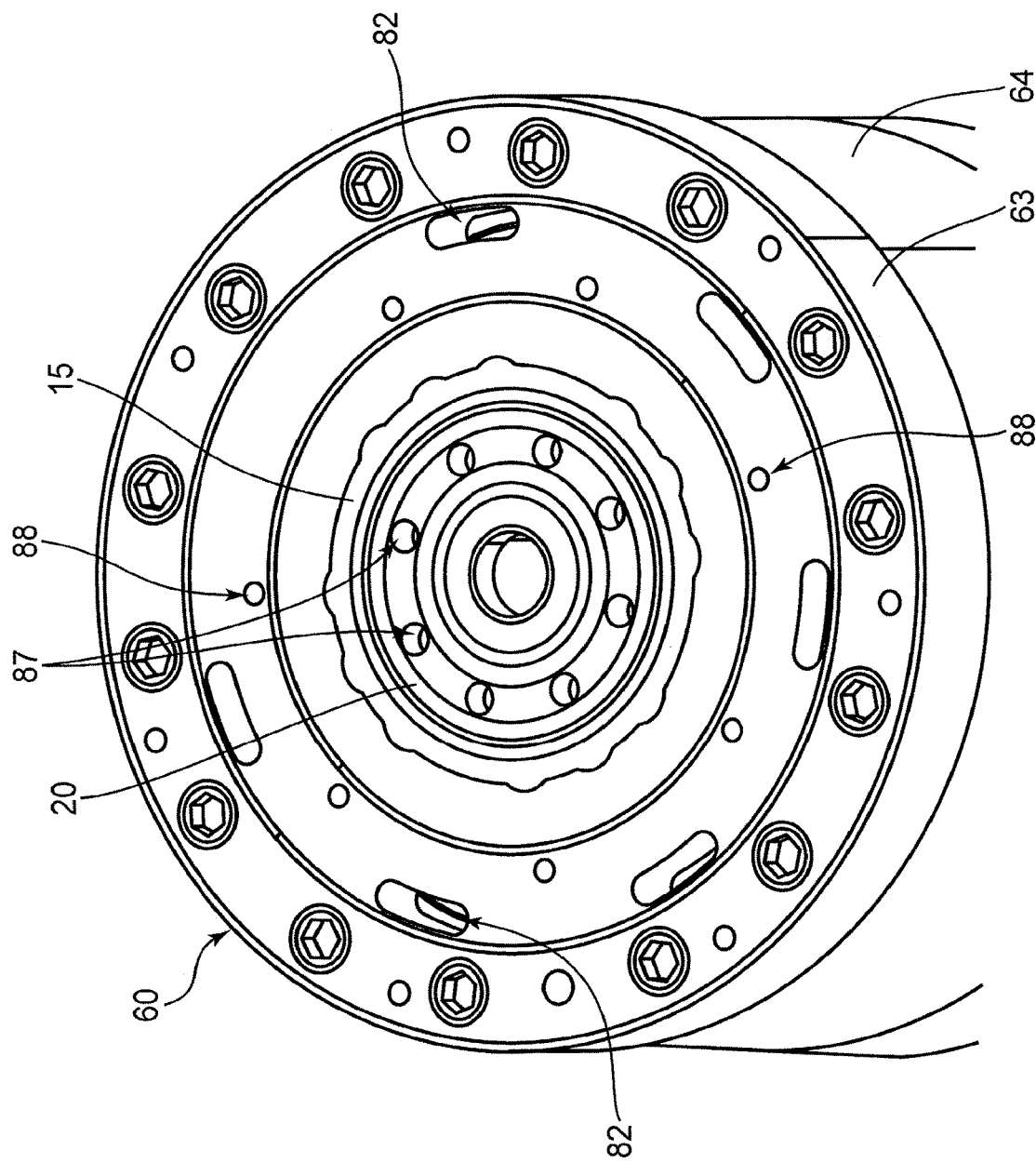
FIG. 12 is a perspective view of the slewing unit cut at the same position as in FIG. 11.

FIG. 4 is a view showing a cross section parallel to the rotation shaft 71 of the slewing unit 3, and is a cross-sectional view when the slewing unit 3 is cut at a position different from FIG. 3. FIG. 5 is a cross-sectional view taken along the line V-V of FIG. 4. FIG. 6 is a perspective view of the slewing unit 3 when the slewing unit 3 is cut at the same position as in FIG. 5. FIG. 7 is a cross-sectional view taken along the line VII-VII of FIG. 4. FIG. 8 is a perspective view of the slewing unit 3 when the slewing unit 3 is cut at the same position as in FIG. 7. FIG. 9 is a cross-sectional view taken along the line IX-IX of FIG. 4. FIG. 10 is a perspective view of the slewing unit 3 when the slewing unit 3 is cut at the same position as in FIG. 9. FIG. 11 is a cross-sectional view taken along the line XI-XI of FIG. 4. FIG. 12 is a perspective view of the slewing unit 3 when the slewing unit 3 is cut at the same position as in FIG. 11.

The spider 20 is a member that supports the rotation side brake members 13 such that the rotation side brake members 13 rotate as the rotation shaft 71 rotates. The spider 20 has a shape that surrounds the rotation shaft 71. Specifically, the spider 20 has an annular shape in plan view, and the outer diameter of the upper portion of the spider 20 is greater than the outer diameter of the lower portion of the spider 20. The plurality of rotation side brake members 13 to be described later is attached to the outer circumferential surface of the upper portion of the spider 20. The spider 20 is disposed between the plurality of rotation side brake members 13 and the rotation shaft 71. The spider 20 is disposed above the sun gear 31. Specifically, the spider 20 is supported by the rotation shaft 71 by being attached to the spider attachment portion of the rotation member 72. More specifically, the spider 20 is supported by the spider attachment portion of the rotation member 72 by, for example, spline coupling.

As shown in FIGS. 3 and 4, the plurality of brake members 13 and 15 is disposed below the piston 11 and above the speed reducer 30, specifically, the plurality of brake members 13 and 15 is disposed above the first deceleration portion at the top of the speed reducer 30. The plurality of brake members 13 and 15 includes a plurality of brake plates 13 and a plurality of separators 15. Each of the plurality of brake plates 13 is one example of the rotation side brake member, and each of the plurality of separators 15 is one example of the housing side brake member. The brake plates 13 and the separators 15 are alternately arranged vertically.

As shown in FIGS. 3, 4, 11, and 12, each of the plurality of brake plates 13 has an annular shape surrounding the rotation shaft 71 and is supported by the spider 20. When the rotational force of the slewing motor 2 is transmitted and the rotation shaft 71 rotates, the plurality of brake plates 13 rotates together with the rotation member 72 and the spider 20.

As shown in FIG. 4, each of the plurality of separators 15 is supported by the housing 60 to face the brake plate 13 in the up-and-down direction. Each of the plurality of separators 15 has, for example, an annular shape surrounding the rotation shaft 71, but the shape of the separator 15 is not limited to the annular shape, and may be any shape as long as the shape can brake the rotation of the rotation shaft 71 by friction with the adjacent brake plate 13.

As shown in FIG. 4, the piston 11 is disposed above the plurality of brake members 13 and 15, and is supported by the housing 60 to be displaceable in the up-and-down direction. As shown in FIGS. 4 to 8, the piston 11 is disposed around the rotation shaft 71 with a spacing to the rotation shaft 71 outside the rotation shaft 71 in the radial direction.

In the present embodiment, the piston 11 has a cylindrical shape surrounding the rotation shaft 71. The piston 11 includes an inner circumferential surface 11A, an outer circumferential surface 11B, a pilot pressure receiving surface 11C, a biasing force receiving surface 11D, an upper surface 11E, and a pressing surface 11F. The inner circumferential surface 11A is located with a spacing outside the outer circumferential surface of the rotation shaft 71 in the radial direction. The outer circumferential surface 11B includes an upper outer circumferential surface and a lower outer circumferential surface located at a position below the upper outer circumferential surface and shifted from the upper outer circumferential surface in the radial direction. The pilot pressure receiving surface 11C is an upward surface that connects the upper outer circumferential surface to the lower outer circumferential surface. The pilot pressure receiving surface 11C displaces the piston 11 downward against upward biasing force of the spring 17 by receiving the pilot pressure to be described later. The biasing force receiving surface 11D receives the upward biasing force from the spring 17. The upper surface 11E is located at a position facing a top plate portion 67 of an upper cover 62 to be described later in the up-and-down direction in the housing 60. The pressing surface 11F gives downward pressing force to the plurality of brake members 13 and 15.

The plurality of brake members 13 and 15 is configured to brake the rotation of the rotation shaft 71 before being decelerated by the speed reducer 30 by receiving the downward pressing force from the pressing surface 11F of the piston 11. In other words, the plurality of brake members 13 and 15 is configured to brake the rotation of the rotation shaft 71 before the driving torque is increased by the speed reducer 30 by receiving the pressing force from the piston 11.

The spring 17 biases the piston 11 upward. The spring 17 includes an upper end that exerts the biasing force on the receiving surface 11D of the piston 11 and a lower end whose downward displacement is restricted by an intervention member 63 of the housing 60 to be described later. The spring 17 is disposed between the biasing force receiving surface 11D of the piston 11 and the intervention member 63 of the housing 60 to be able to expand and contract in the up-and-down direction. The upper end of the spring 17 is located below a plurality of piston passages 85 to be described later.

The housing 60 includes a rotation shaft support portion 61, the upper cover 62, the intervention member 63, and a speed reducer cover 64, which are disposed in this order from the top. The rotation shaft support portion 61 supports the slewing motor 2 and rotatably supports the rotation shaft 71 extending downward from the slewing motor 2.

The upper cover 62 is disposed below the rotation shaft support portion 61 and is fixed to the rotation shaft support portion 61 by, for example, bolts. The upper cover 62 has a substantially cylindrical shape that can surround the rotation shaft 71 and the piston 11, and can accommodate inside the rotation shaft 71 extending downward from the slewing motor 2.

Specifically, in the present embodiment, the upper cover 62 includes an inner cylindrical portion 65, an outer cylindrical portion 66, the top plate portion 67, and a plurality of bridges 68. The inner cylindrical portion 65 has a cylindrical shape surrounding the rotation shaft 71 and the piston 11. The outer cylindrical portion 66 has a cylindrical shape surrounding the inner cylindrical portion 65, and is located with a spacing outside the inner cylindrical portion 65 in the radial direction. The top plate portion 67 has an annular shape surrounding the rotation shaft 71 and extending in the radial direction from the upper end of the inner cylindrical portion 65 to the upper end of the outer cylindrical portion 66. The top plate portion 67 blocks an upper opening between the inner cylindrical portion 65 and the outer cylindrical portion 66. The plurality of bridges 68 is located at intervals in the circumferential direction and each connects the upper portion of the inner cylindrical portion 65 to the upper portion of the outer cylindrical portion 66. The circumferential direction is the circumferential direction of the inner cylindrical portion 65. In the present embodiment, the circumferential direction of the inner cylindrical portion 65 is the same direction as the circumferential direction of the rotation shaft 71. A pilot oil passage 99 is formed in at least one of the plurality of bridges 68. Note that the inner cylindrical portion 65 may include a member different from the outer cylindrical portion 66 and the top plate portion 67. In the present embodiment, the upper cover 62 includes the plurality of bridges 68, but the number of bridges 68 may be one.

The opening formed in the center of the upper cover 62, that is, the central opening of the top plate portion 67 is blocked by the rotation shaft support portion 61. Note that the rotation shaft support portion 61 and the upper cover 62 may include a single member. The rotation shaft support portion 61 may be a member that constitutes part of the slewing motor 2.

The inner cylindrical portion 65 is located to surround the piston 11 and guides the piston 11 in the up-and-down direction. The inner cylindrical portion 65 is one example of a guide portion. An inner circumferential surface 65A of the inner cylindrical portion 65 is a surface parallel to the outer circumferential surface 11B of the piston 11, and faces the outer circumferential surface 11B of the piston 11 with a slight gap in the radial direction. The inner circumferential surface 65A of the inner cylindrical portion 65 includes an upper inner circumferential surface and a lower inner circumferential surface located at a position below the upper inner circumferential surface and shifted from the upper inner circumferential surface in the radial direction. A connection surface that connects the upper inner circumferential surface to the lower inner circumferential surface is a downward surface facing the pilot pressure receiving surface 11C of the piston 11 in the up-and-down direction with a spacing in the up-and-down direction. The upper outer circumferential surface and the pilot pressure receiving surface 11C of the piston 11, and the lower inner circumferential surface and the connection surface of the inner cylindrical portion 65 define a space to which a pilot oil to be described later is supplied.

At least one O-ring 98 is disposed between the outer circumferential surface 11B of the piston 11 and the inner circumferential surface 65A of the inner cylindrical portion 65. Specifically, the O-ring is disposed between the upper outer circumferential surface of the outer circumferential surface 11B of the piston 11 and the upper inner circumferential surface of the inner circumferential surface 65A of the inner cylindrical portion 65. Another O-ring is disposed between the lower outer circumferential surface of the outer circumferential surface 11B of the piston 11 and the lower inner circumferential surface of the inner circumferential surface 65A of the inner cylindrical portion 65. The O-ring 98 is one example of a seal member.

The top plate portion 67 includes an inner projecting portion projecting inside the upper end of the inner cylindrical portion 65 in the radial direction. The inner projecting portion includes a lower surface 67A facing the upper surface 11E of the piston 11 in the up-and-down direction. When the upper surface 11E of the piston 11 touches the lower surface 67A of the top plate portion 67, the lower surface 67A restricts further upward displacement of the piston 11 from this position. That is, the lower surface 67A of the top plate portion 67 determines the upper limit position of the piston 11.

As shown in FIG. 4, the intervention member 63 is interposed between the piston 11 and the speed reducer 30. The intervention member 63 is fixed to the upper cover 62 below the upper cover 62. The intervention member 63 has a shape surrounding the rotation shaft 71, the rotation member 72, the spider 20, and the plurality of brake plates 13. Specifically, in the present embodiment, the intervention member 63 has a disk shape. The intervention member 63 includes an inner circumferential surface 63A, a spring placement surface 63B, a pressing force receiving surface 63C, and an upper surface 63D. The inner circumferential surface 63A supports the plurality of separators 15. The lower end of the spring 17 is disposed on the spring placement surface 63B. The pressing force receiving surface 63C receives the pressing force of the piston 11 via the plurality of brake members 13 and 15. The upper surface 63D will be described later.

Each of the plurality of brake plates 13 is disposed to extend outward in the radial direction from the outer circumferential surface of the spider 20, and each of the plurality of separators 15 is disposed to extend inward in the radial direction from the inner circumferential surface 63A of the intervention member 63. The brake members 13 and 15 are disposed to be sandwiched between the pressing surface 11F of the piston 11 and the pressing force receiving surface 63C of the intervention member 63.

The speed reducer cover 64 is fixed to the intervention member 63 below the intervention member 63. The speed reducer cover 64 has a shape that can accommodate the speed reducer 30. The speed reducer cover 64 includes, for example, a barrel portion having a shape (for example, cylindrical shape) that surrounds the speed reducer 30, and a bottom portion (not shown) covering the lower portion of the speed reducer 30. The output shaft 4 is disposed below the bottom portion. The rotational force output from the deceleration portion at the bottom of the speed reducer 30 (second deceleration portion or third deceleration portion in the present embodiment) is transmitted to the output shaft 4. Note that the bottom portion may include a member different from the speed reducer cover 64.

The breather 97 is fixed to the upper portion of the housing 60, specifically to the upper portion of the upper cover 62 for the purpose of suction and discharge of gas in the housing 60, air filtering, and the like. The breather 97 is disposed at a position corresponding to a through hole formed in the upper portion of the upper cover 62 and has a shape extending upward from the upper cover 62.

The housing 60 has an internal space that accommodates the rotation shaft 71, the rotation member 72, the spider 20, the plurality of brake members 13 and 15, the piston 11, the spring 17, the speed reducer 30, and the like. This internal space includes a lower space 81, a plurality of outer passages 82, an upper outer space 83, a plurality of guide portion passages 84, the plurality of piston passages 85, an upper central space 86, a plurality of inner passages 87, a plurality of seal member lubrication passages 88, a guide portion lower passage 89, and a piston lower passage 90. The guide portion passages 84 and the piston passages 85 are one example of a supply passage, and the guide portion lower passage 89 and the piston lower passage 90 are another example of the supply passage.

The lower space 81 is a space in which the speed reducer 30 is disposed, and is a space surrounded by the inner circumferential surface of the speed reducer cover 64. Specifically, in the present embodiment, the lower space 81 is defined primarily by the inner surface of the speed reducer cover 64 and the lower surface of the intervention member 63. The lower space 81 is formed below the outer passage 82, the upper outer space 83, the guide portion passages 84, the piston passages 85, the upper central space 86, the inner passages 87, the seal member lubrication passages 88, the guide portion lower passage 89, and the piston lower passage 90.

The upper central space 86 is a space in which part or all of the rotation shaft 71, the piston 11, and the upper portion of the rotation member 72 are disposed, and is a space surrounded by the inner circumferential surface of the upper cover 62. Specifically, in the present embodiment, the upper central space 86 is primarily defined by the lower surface of the rotation shaft support portion 61, the inner circumferential surface of the upper cover 62, the upper surface of the spider 20, and the upper surface of the intervention member 63.

The upper outer space 83 is a space formed outside the upper central space 86 in the radial direction and above the lower space 81. The upper outer space 83 is a space between the inner cylindrical portion 65 of the upper cover 62 and the outer cylindrical portion 66 of the upper cover 62. Specifically, the upper outer space 83 is defined by the outer circumferential surface of the inner cylindrical portion 65, the inner circumferential surface of the outer cylindrical portion 66, the lower surface of the top plate portion 67, and the upper surface of the intervention member 63.

The upper outer space 83 is intermittently or continuously formed in the circumferential direction along the outer circumferential surface of the inner cylindrical portion 65 of the upper cover 62. The upper outer space 83 includes a single space outside the inner cylindrical portion 65 in the radial direction, and is formed over the entire circumference along the outer circumferential surface of the inner cylindrical portion 65. The upper outer space 83 is formed such that the size of the upper outer space 83 in the circumferential direction is larger than the size of the upper outer space 83 in the up-and-down direction, and that the size of the upper outer space 83 in the circumferential direction is larger than the size of the upper outer space 83 in the radial direction.

Note that the upper outer space 83 may include a plurality of spaces partitioned by partitions (not shown) arranged in the circumferential direction outside the inner cylindrical portion 65 in the radial direction. In this case as well, each of the plurality of spaces that constitute the upper outer space 83 is preferably formed such that the size in the circumferential direction is larger than the size in the up-and-down direction, and that the size in the circumferential direction is larger than the size in the radial direction.

The plurality of outer passages 82 is formed in the intervention member 63. Each of the plurality of outer passages 82 includes a through-hole penetrating the intervention member 63 in the up-and-down direction, and causes the lower space 81 to communicate with the upper outer space 83. The plurality of outer passages 82 is formed in the intervention member 63 to be arranged along the circumferential direction at intervals in the circumferential direction. In the present embodiment, each of the plurality of outer passages 82 has an opening shape in which the dimension in the circumferential direction is larger than the dimension in the radial direction. However, the shape of the outer passage 82 is not limited to such a shape. The number of outer passages 82 may be one.

The plurality of guide portion passages 84 is passages formed in the inner cylindrical portion 65 (one example of guide portion), leading to the upper outer space 83. In the present embodiment, the plurality of guide portion passages 84 is formed in the upper portion of the inner cylindrical portion 65 as shown in FIGS. 3 and 4, and is formed in the inner cylindrical portion 65 to be arranged along the circumferential direction at intervals in the circumferential direction as shown in FIGS. 5 and 6. However, at least one of the plurality of guide portion passages 84 may be formed in an intermediate area between the upper end and the lower end of the inner cylindrical portion 65. The number of guide portion passages 84 may be one.

The plurality of piston passages 85 is passages formed in the piston 11, leading to the upper central space 86. In the present embodiment, the plurality of piston passages 85 is formed in the upper portion of the piston 11 as shown in FIG. 3, and is formed in the piston 11 to be arranged along the circumferential direction at intervals in the circumferential direction as shown in FIGS. 5 and 6. However, at least one of the plurality of piston passages 85 may be formed in an intermediate area between the upper end and the lower end of the piston 11. The number of piston passages 85 may be one.

Specifically, in the present embodiment, six guide portion passages 84 are formed in the inner cylindrical portion 65, and six piston passages 85 are formed in the piston 11. Three guide portion passages 84 out of the six guide portion passages 84 are located at positions corresponding to three piston passages 85, that is, at positions arranged with the three piston passages 85 in the radial direction. On the other hand, the remaining three guide portion passages 84 are not located at positions corresponding to the piston passages 85. Note that in terms of supplying the lubricant as evenly as possible to the plurality of brake members 13 and 15 all around, the plurality of piston passages 85 is preferably arranged at regular intervals in the circumferential direction. For the similar reason, the plurality of guide portion passages 84 is preferably arranged at regular intervals in the circumferential direction.

The set of the guide portion passage 84 and the piston passage 85 that is continuous inside the guide portion passage 84 in the radial direction constitutes a first supply passage. The first supply passage is a passage that causes the upper outer space 83 to communicate with the upper central space 86, and is one example of the supply passage. The first supply passage is a passage formed at a position where the lubricant that has moved in the lower space 81, the outer passages 82, and the upper outer space 83 in this order can be supplied to the plurality of brake members 13 and 15.

The plurality of inner passages 87 is formed in the spider 20 (one example of supporting member). Each of the plurality of inner passages 87 includes a through-hole penetrating the spider 20 in the up-and-down direction, and causes the upper central space 86 to communicate with the lower space 81. The plurality of inner passages 87 is formed in the spider 20 to be arranged along the circumferential direction at intervals in the circumferential direction. In the present embodiment, each of the plurality of inner passages 87 has a circular shape in plan view. However, the shape of the inner passage 87 is not limited to such a shape. The number of inner passages 87 may be one.

As shown in FIG. 4, the plurality of seal member lubrication passages 88 is formed in the intervention member 63. Each of the plurality of seal member lubrication passages 88 includes a through-hole penetrating the intervention member 63 in the up-and-down direction, and causes a space 91 located directly below the lower edge of the outer circumferential surface 11B of the piston 11 to communicate with the lower space 81. As shown in FIGS. 9 to 12, the plurality of seal member lubrication passages 88 is formed in the intervention member 63 to be arranged along the circumferential direction at intervals in the circumferential direction. In the present embodiment, each of the plurality of seal member lubrication passages 88 has a circular shape in plan view. However, the shape of the inner passage 87 is not limited to such a shape. The number of inner passages 87 may be one.

As shown in FIG. 4, the upper surface 63D of the intervention member 63 includes: an outer upper surface portion 63D1, which is a portion that defines the lower portion of the upper outer space 83; an intermediate upper surface portion 63D2, which is a portion facing the inner cylindrical portion 65 (one example of guide portion) in the up-and-down direction; and an inner upper surface portion 63D3, which is a portion facing the piston 11 in the up-and-down direction.

The guide portion lower passage 89 is a passage between the intermediate upper surface portion 6312 of the intervention member 63 and the inner cylindrical portion 65, leading to the upper outer space 83. The piston lower passage 90 is a passage between the inner upper surface portion 63D3 of the intervention member 63 and the piston 11, and causes the guide portion lower passage 89 to communicate with the upper central space 86.

The set of the guide portion lower passage 89 and the piston lower passage 90 that is continuous inside the guide portion lower passage 89 in the radial direction constitutes a second supply passage. The second supply passage is a passage that causes the upper outer space 83 to communicate with the upper central space 86, and is one example of the supply passage. The second supply passage is a passage formed at a position where the lubricant that has moved in the lower space 81, the outer passages 82, and the upper outer space 83 in this order can be supplied to the plurality of brake members 13 and 15.

As shown in FIGS. 4 and 10, the upper surface 63D of the intervention member 63 includes an intermediate portion 63M between an annular portion outward in the radial direction and an annular portion inward in the radial direction. The intermediate portion 63M has an annular shape that is continuous along the circumferential direction in plan view. The plurality of outer passages 82 and the plurality of seal member lubrication passages 88 are formed in the intermediate portion 63M. The intermediate portion 63M is located below the outer annular portion and the inner annular portion in the radial direction via a step. When the plurality of outer passages 82 and the plurality of seal member lubrication passages 88 are formed in the intermediate portion 63M located below the outer portion and the inner portion in this way, for example, if the slewing motor 2 stops, the lubricant that is located above the upper surface 63D of the intervention member 63 is likely to fall from the place and gather in the intermediate portion 63M, making it more likely to be collected into the lower space 81 through the plurality of outer passages 82 and the plurality of seal member lubrication passages 88.

The lubricant is stored in advance in the internal space of the housing 60.

Meanwhile, to prevent the lubricant from leaking out of the breather 97, a predetermined air volume is secured in the housing 60. For example, the amount of the lubricant stored in the housing 60 may be adjusted such that the liquid surface of the lubricant is below the piston 11 and above the speed reducer 30 in a state where the slewing motor 2 is stopped. Specifically, in the present embodiment, as shown in FIG. 3, the amount of the lubricant stored in the housing 60 is adjusted such that the liquid surface L1 of the lubricant is located between the brake member at the highest position and the brake member at the lowest position among the plurality of brake members 13 and 15 in a state where the slewing motor 2 is stopped. Note that the amount of the lubricant stored in the housing 60 is preferably adjusted such that the plurality of brake members 13 and 15 are entirely immersed in the lubricant in a state where the slewing motor 2 is stopped.

Meanwhile, in a state where the slewing motor 2 is operating, the rotation shaft 71 is rotating, and the speed reducer 30 is being driven, the lubricant within the lower space 81 is agitated by the speed reducer 30, thereby causing the liquid surface L2 of the lubricant to have a mortar shape as shown in FIG. 3. The liquid surface L2 at this time is located below the plurality of brake members 13 and 15.

The lubricant within the lower space 81 is agitated by the speed reducer 30 (in particular, plurality of planetary gears 32 of the first deceleration portion). Part of the agitated lubricant flows from the lower space 81 through the outer passages 82 into the upper outer space 83. Then, part of the lubricant that has flowed into the upper outer space 83 is guided by the guide portion passages 84 and the piston passages 85 and flows into the upper central space 86, falls in the upper central space 86, and is supplied to the plurality of brake members 13 and 15, the rotation member 72 including the sun gear 31, and the like. Note that the outer passages 82 are not depicted in the cross section shown in FIG. 3, but the plurality of outer passages 82 exists in places shifted from the cross section in the circumferential direction, and the lubricant flows into the upper outer space 83 through the outer passages 82.

Part of the lubricant that has flowed from the lower space 81 through the outer passages 82 into the upper outer space 83 is guided to the guide portion lower passage 89 and the piston lower passage 90, and is supplied to the plurality of brake members 13 and 15, the rotation member 72 including the sun gear 31, and the like, as shown in FIG. 4.

As shown in FIG. 4, part of the lubricant agitated in the lower space 81 flows from the lower space 81 through the seal member lubrication passages 88 into the space 91 located directly below the lower edge of the outer circumferential surface 11B of the piston 11, and is supplied to the area between the inner cylindrical portion 65 (one example of guide portion) and the piston 11, and the seal member located in this area.

As described above, in the slewing unit 3 according to the present embodiment, the plurality of brake members 13 and 15 is disposed above the speed reducer 30 and receives the pressing force from the piston 11, thereby braking the rotation of the rotation shaft 71 before being decelerated by the speed reducer 30, that is, the rotation of the rotation shaft 71 before the torque is increased by the speed reducer 30. This allows compactification of the plurality of brake members 13 and 15 and the piston 11 giving the pressing force to the brake members 13 and 15 in the radial direction more than in a conventional case of braking the rotation after being decelerated by the speed reducer and the torque has increased. This compactification makes it possible to form an appropriately sized space within the housing 60 for securing the air volume in an area outside the piston 11 in the radial direction and above the speed reducer 30 while suppressing an increase in the size of the housing 60. Moreover, the upper outer space 83 formed in the area is not only used to secure the air volume, but also used as part of the passage for supplying the lubricant stored in the lower space 81 located below the upper outer space 83 to the brake members 13 and 15. Therefore, the amount of the lubricant stored in advance in the housing 60 may be a level that allows the lubricant stored in the lower space 81 where the speed reducer 30 is disposed to move in the lower space 81, the outer passages 82, and the upper outer space 83 in this order, to be guided inward in the radial direction by at least one of the first supply passage and the second supply passage, and to be supplied to the plurality of brake members 13 and 15. That is, the amount of the lubricant stored in advance in the housing 60 is required at least to be a level that allows the lubricant stored in the lower space 81 to be supplied to the plurality of brake members 13 and 15, and the liquid surface L2 of the lubricant does not need to be higher than the plurality of brake members 13 and 15 when the speed reducer 30 is driven by the rotational force of the slewing motor 2. This allows a decrease in the amount of the lubricant stored in advance in the housing 60 and a further increase in the air volume accordingly. Therefore, the slewing unit 3 can secure the appropriate air volume in the housing 60 and appropriately lubricate the speed reducer 30 and the brake members 13 and 15 while suppressing an increase in the size of the housing 60.

MODIFICATIONS

The construction machine according to the embodiment of the present disclosure has been described above, but the present disclosure is not limited to these modes, and includes the following modifications, for example.

Figure 13:
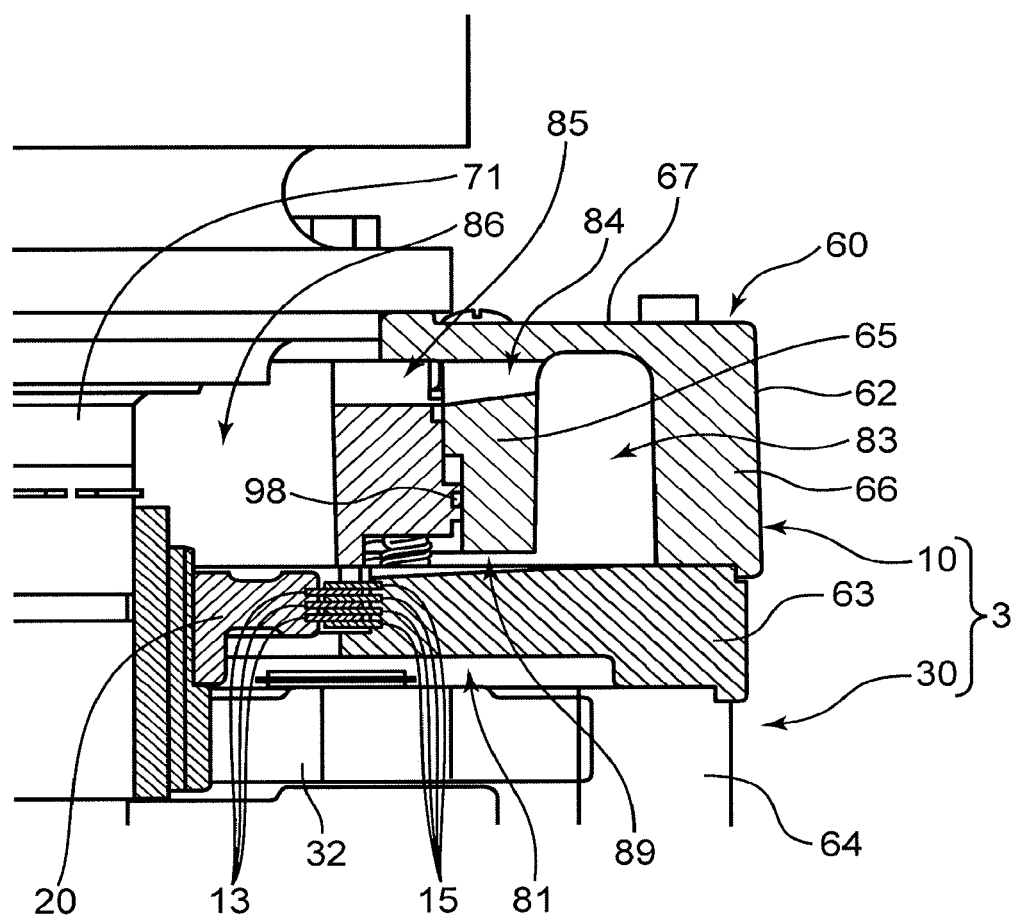
FIG. 13 is a cross-sectional view showing part of the slewing unit according to a first modification of the embodiment.

FIG. 13 is a cross-sectional view showing part of a slewing unit 3 according to a first modification of the embodiment. In this first modification, the bottom surface of a guide portion passage 84 is inclined with respect to the horizontal plane such that the bottom surface is located downward as the bottom surface approaches a rotation shaft 71. In this first modification, the lubricant that has reached a first supply passage is likely to flow toward an upper central space 86 along the bottom surface of the guide portion passage 84 that is inclined with respect to the horizontal plane, thereby making it possible to suppress the lubricant from flowing backward in the first supply passage. This allows the lubricant to be efficiently supplied to the plurality of brake members 13 and 15.

Note that the bottom surface of the piston passage 85 may be inclined with respect to the horizontal plane such that the bottom surface is located downward as the bottom surface approaches the rotation shaft 71. In this case as well, the lubricant that has reached the first supply passage is likely to flow toward the upper central space 86 along the bottom surface of the piston passage 85 that is inclined with respect to the horizontal plane, thereby allowing the lubricant to be more efficiently supplied to the plurality of brake members 13 and 15.

In the first modification, the upper surface of the intervention member 63, specifically the outer upper surface portion, the intermediate upper surface portion, and the inner upper surface portion of the intervention member 63 are inclined with respect to the horizontal plane to be located downward as the upper surface approaches the rotation shaft 71. In this first modification, the lubricant that has reached the second supply passage is likely to flow toward the upper central space 86 along the upper surface of the intervention member 63 that is inclined with respect to the horizontal plane, thereby making it possible to suppress the lubricant from flowing backward in the second supply passage. This allows the lubricant to be efficiently supplied to the plurality of brake members. Note that at least one of the outer upper surface portion, the intermediate upper surface portion, and the inner upper surface portion of the intervention member 63 may be inclined with respect to the horizontal plane, and other upper surface portions may be horizontal.

Although illustration is omitted, the piston passage 85 may be located at a position lower than the guide portion passage 84 via a step, for example. In this case as well, the backflow of the lubricant that has reached the piston passage 85 via the guide portion passage 84 and returning to the guide portion passage 84 is suppressed, thereby allowing the lubricant to be more efficiently supplied to the plurality of brake members 13 and 15.

Figure 14:
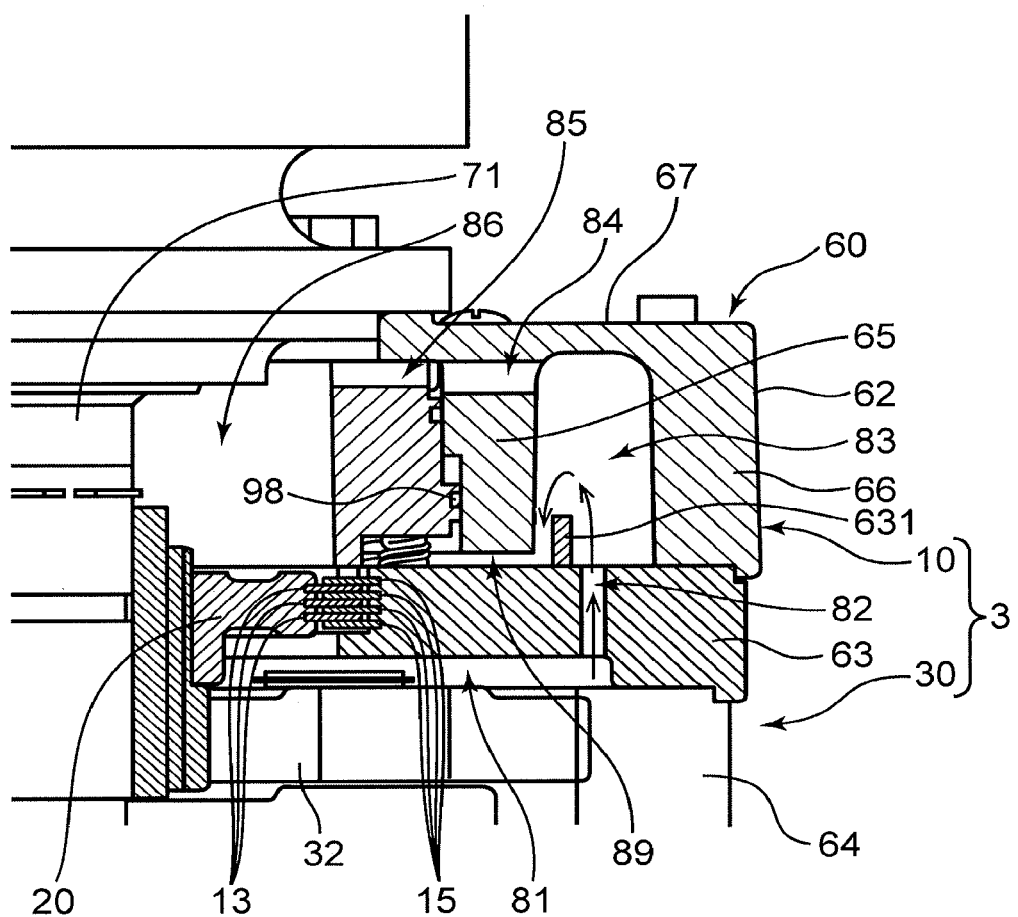
FIG. 14 is a cross-sectional view showing part of the slewing unit according to a second modification of the embodiment.

FIG. 14 is a cross-sectional view showing part of a slewing unit 3 according to a second modification of the embodiment. In this second modification, an intervention member 63 includes a backflow prevention wall 631 located inside an opening at the upper end of an outer passage 82 in the radial direction and outside an inner cylindrical portion 65 (one example of guide portion) in the radial direction. The backflow prevention wall 631 stands upward from an outer upper surface portion of the intervention member 63. The second modification suppresses the lubricant that has moved inside the backflow prevention wall 631 in the radial direction from returning outside the backflow prevention wall 631 in the radial direction, thereby allowing the lubricant to be more efficiently supplied to a plurality of brake members 13 and 15.

The supply passage leading to an upper outer space 83 is required at least to allow the lubricant that has passed through a lower space 81, outer passages 82, and the upper outer space 83 in this order to be guided inward in the radial direction and supplied to the plurality of brake members 13 and 15. Therefore, the supply passage may be formed, for example, in the top plate portion of an upper cover 62.

In the above-described embodiment, the inner cylindrical portion 65 (one example of guide portion) has a cylindrical shape formed to continuously surround a rotation shaft 71 and a piston 11 over the entire circumference of the circumferential direction, but the shape of the guide portion is not limited to the above-described embodiment. The guide portion may be configured, for example, to intermittently surround the rotation shaft 71 and the piston 11 to guide the piston 11 in the up-and-down direction. The guide portion may have a tubular shape other than the cylindrical shape.

The construction machine has been a crane, but may be another construction machine such as a hydraulic excavator. The machine body slewably supporting the upper slewing body does not need to be self-travelling like the lower travelling body.

The present disclosure provides the slewing unit of a construction machine that can secure the appropriate air volume in the housing and appropriately lubricate the speed reducer and the brake members while suppressing an increase in the size of the housing.

The provided slewing unit of a construction machine includes: a rotation shaft to which rotational force of a slewing motor is transmitted, the rotation shaft extending in an up-and-down direction; a speed reducer to decelerate rotation of the rotation shaft; a piston located to surround the rotation shaft with a spacing to the rotation shaft outside the rotation shaft in a radial direction, the piston being displaceable in the up-and-down direction; a housing that accommodates the rotation shaft, the speed reducer, and the piston, the housing including a guide portion that is located to surround the piston to guide the piston in the up-and-down direction; and a plurality of brake members that includes: a rotation side brake member that is located to surround the rotation shaft and rotates as the rotation shaft rotates; and a housing side brake member supported by the housing to face the rotation side brake member in the up-and-down direction, the plurality of brake members being located below the piston, in which an upper central space in which at least part of the rotation shaft is disposed, the upper central space being a space surrounded by an inner circumferential surface of the piston; a lower space in which the speed reducer is disposed, the lower space being located below the upper central space; an upper outer space located outside the piston in the radial direction and above the lower space; an outer passage that connects the lower space to the upper outer space; and at least one supply passage that guides, inward in the radial direction, a lubricant that has passed through the lower space, the outer passage, and the upper outer space in this order to supply the lubricant to the plurality of brake members located below the piston are formed in the housing, and the plurality of brake members is disposed above the speed reducer and is configured to brake, by receiving pressing force from the piston, the rotation of the rotation shaft before being decelerated by the speed reducer.

In this slewing unit, since the plurality of brake members disposed above the speed reducer brakes the rotation of the rotation shaft before being decelerated by the speed reducer, compactification of the plurality of brake members and the piston is possible, and since it is possible to form the upper outer space, which is an appropriately sized space for securing the air volume and a space used as part of a passage for supplying the lubricant to the plurality of brake members in the area outside the piston in the radial direction newly available because of the compactification, it is possible to secure an appropriate air volume in the housing while suppressing the size of the housing from increasing, and to appropriately lubricate the speed reducer and the brake members. Specifically, this will be described as follows.

In this slewing unit, the plurality of brake members is disposed above the speed reducer and receives the pressing force from the piston, thereby braking the rotation of the rotation shaft before being decelerated by the speed reducer, that is, the rotation of the rotation shaft before the torque is increased by the speed reducer. This allows compactification of the plurality of brake members and the piston giving the pressing force to the brake members in the radial direction more than in a conventional case of braking the rotation after being decelerated by the speed reducer and the torque has increased. This compactification makes it possible to form an appropriately sized space within the housing for securing the air volume in an area outside the piston in the radial direction and above the speed reducer while suppressing an increase in the size of the housing. Moreover, the upper outer space formed in the area is not only used to secure the air volume, but also used as part of the passage for supplying the lubricant stored in the lower space located below the upper outer space to the brake members. Therefore, the amount of the lubricant stored in advance in the housing may be a level that allows the lubricant stored in the lower space where the speed reducer is disposed to move in the lower space, the outer passage, and the upper outer space in this order, to be guided to the supply passage, and to be supplied to the plurality of brake members. That is, the amount of the lubricant stored in advance in the housing is required at least to be a level that allows the lubricant stored in the lower space to be supplied to the plurality of brake members, and the liquid surface of the lubricant does not need to be higher than the plurality of brake members when the speed reducer is driven by the rotational force of the slewing motor. This allows a decrease in the amount of the lubricant stored in advance in the housing and a further increase in the air volume accordingly. Therefore, the slewing unit can secure the appropriate air volume in the housing and appropriately lubricate the speed reducer and the brake members while suppressing an increase in the size of the housing.

In the slewing unit, the upper outer space is preferably formed such that a size of the upper outer space in a circumferential direction is larger than a size of the upper outer space in the up-and-down direction. With this configuration, the upper outer space is not an elongated space in the up-and-down direction, but a space extending in the circumferential direction in the housing. Therefore, a larger air volume can be secured in the housing.

In the slewing unit, preferably, the guide portion has a cylindrical shape surrounding the piston, the housing further includes an outer cylindrical portion located to surround the guide portion with a spacing to the guide portion outside the guide portion in the radial direction, and the upper outer space is a space defined by an outer circumferential surface of the guide portion and an inner circumferential surface of the outer cylindrical portion. With this configuration, the circumferentially expanding upper outer space can be formed along the circumferential direction between the cylindrical guide portion and the outer cylindrical portion.

In the slewing unit, preferably, the at least one supply passage includes a first supply passage including: a guide portion passage that is a passage formed in the guide portion and leading to the upper outer space; and a piston passage that is a passage formed in the piston and connecting the guide portion passage to the upper central space. With this configuration, the first supply passage including the guide portion passage and the piston passage can guide the lubricant that has passed through the lower space, the outer passage, and the upper outer space in this order to the upper central space that is a space surrounded by the inner circumferential surface of the piston, and supply the lubricant to the plurality of brake members located below the piston. With this configuration, since the supply passage is formed in the guide portion and the piston, it is possible to suppress an increase in size of the housing in the height direction.

The slewing unit preferably further includes a supporting member disposed between the rotation side brake member and the rotation shaft, the supporting member being located to surround the rotation shaft, the supporting member supporting the rotation side brake member such that the rotation side brake member rotates as the rotation shaft rotates, in which an inner passage penetrating the supporting member in the up-and-down direction to connect the upper central space to the lower space is further formed in the housing. With this configuration, the lubricant that has passed through the lower space, the outer passage, the upper outer space, and the first supply passage in this order and has flowed into the upper central space can be efficiently returned to the lower space through the inner passage formed in the supporting member.

In the slewing unit, preferably, at least one of the guide portion passage and the piston passage includes a portion that is inclined with respect to a horizontal plane to be located downward as the portion approaches the rotation shaft. With this configuration, the lubricant that has reached the first supply passage is likely to flow toward the upper central space along the portion inclined with respect to the horizontal plane, thereby making it possible to suppress the lubricant from flowing backward in the first supply passage. This allows the lubricant to be efficiently supplied to the plurality of brake members.

The slewing unit preferably further includes a biasing member that biases the piston upward, in which a pilot oil passage that enables a pilot oil for moving the piston downward against upward biasing force exerted by the biasing member to be supplied toward the piston is formed in the housing, and the biasing member includes an upper end that transmits the upward biasing force to the piston, and the upper end is located below the piston passage. With this configuration, since the biasing member is located below the piston passage, the biasing member does not interfere with the flow of lubricant in the piston passage.

In the slewing unit, preferably, the housing includes: an intervention member in which the outer passage is formed, the intervention member being interposed between the piston and the speed reducer, the intervention member being located to surround the rotation shaft and the rotation side brake member, the intervention member supporting the housing side brake member; and an upper cover including the guide portion, the upper cover being disposed above the intervention member and connected to the intervention member. With this configuration, since the upper cover and the intervention member are formed as separate members, machining of parts constituting the slewing unit is facilitated, and assembly of the slewing unit is facilitated.

In the slewing unit, the intervention member may include an upper surface, the upper surface may include an outer upper surface portion that is a portion defining a lower portion of the upper outer space, an intermediate upper surface portion that is a portion facing the guide portion in the up-and-down direction, and an inner upper surface portion that is a portion facing the piston in the up-and-down direction, and the at least one supply passage may include a second supply passage including: a guide portion lower passage that is a passage between the intermediate upper surface portion of the intervention member and the guide portion, leading to the upper outer space; and a piston lower passage that is a passage between the inner upper surface portion of the intervention member and the piston, the piston lower passage guiding, inward in the radial direction, the lubricant that has passed through the lower space, the outer passage, the upper outer space, and the guide portion lower passage in this order to supply the lubricant to the plurality of brake members located below the piston. With this configuration, the second supply passage including the guide portion lower passage and the piston lower passage can supply the lubricant that has passed through the lower space, the outer passage, and the upper outer space in this order to the plurality of brake members located below the piston. With this configuration, since the guide portion lower passage and the piston lower passage are located lower than the guide portion passage and the piston passage, the lubricant is supplied to the plurality of brake members easily.

In this case, preferably, at least one of the outer upper surface portion, the intermediate upper surface portion, and the inner upper surface portion of the intervention member includes a portion that is inclined with respect to the horizontal plane to be located downward as the portion approaches the rotation shaft. With this configuration, the lubricant that has reached the supply passage is likely to flow toward the upper central space along the portion inclined with respect to the horizontal plane, thereby making it possible to suppress the lubricant from flowing backward in the supply passage. This allows the lubricant to be efficiently supplied to the plurality of brake members.

The intervention member preferably includes a backflow prevention wall that is a wall located inside an opening of an upper end of the outer passage in the radial direction and outside the guide portion in the radial direction, the backflow prevention wall standing upward from the outer upper surface portion of the intervention member. This configuration suppresses the lubricant that has moved inside the backflow prevention wall in the radial direction from returning outside the backflow prevention wall in the radial direction, thereby allowing the lubricant to be more efficiently supplied to the plurality of brake members.

In the slewing unit, the intervention member preferably includes a receiving surface that receives the plurality of brake members that receives the pressing force by the piston. With this configuration, stable braking characteristics can be obtained.

The slewing unit preferably further includes a seal member disposed between the guide portion and an outer circumferential surface of the piston, in which a seal member lubrication passage connecting a space located directly below a lower edge of the outer circumferential surface of the piston to the lower space is preferably further formed in the housing. This configuration, which can supply the lubricant to the sealing member between the guide portion and the piston, can improve the life of the seal member and smoothly displace the piston in the up-and-down direction.

The invention claimed is:

1. A slewing unit of a construction machine, the slewing unit comprising:

a rotation shaft to which rotational force of a slewing motor is transmitted, the rotation shaft extending in an up-and-down direction;

a speed reducer to decelerate rotation of the rotation shaft;

a piston located to surround the rotation shaft with a spacing to the rotation shaft outside the rotation shaft in a radial direction, the piston being displaceable in the up-and-down direction;

a housing that accommodates the rotation shaft, the speed reducer, and the piston, the housing including a guide portion that is located to surround the piston to guide the piston in the up-and-down direction; and a plurality of brake members that includes: a rotation side brake member that is located to surround the rotation shaft and rotates as the rotation shaft rotates; and a housing side brake member supported by the housing to face the rotation side brake member in the up-and-down direction, the plurality of brake members being located below the piston, wherein an upper central space in which at least part of the rotation shaft is disposed, the upper central space being a space surrounded by an inner circumferential surface of the piston; a lower space in which the speed reducer is disposed, the lower space being located below the upper central space; an upper outer space located outside the piston in the radial direction and above the lower space; an outer passage that connects the lower space to the upper outer space; and at least one supply passage that guides, inward in the radial direction, a lubricant that has passed through the lower space, the outer passage, and the upper outer space in this order to supply the lubricant to the plurality of brake members located below the piston are formed in the housing, and the plurality of brake members is disposed above the speed reducer and is configured to brake, by receiving pressing force from the piston, the rotation of the rotation shaft before being decelerated by the speed reducer.

2. The slewing unit of a construction machine according to claim 1, wherein the upper outer space is formed such that a size of the upper outer space in a circumferential direction is larger than a size of the upper outer space in the up-and-down direction.

3. The slewing unit of a construction machine according to claim 1, wherein the guide portion has a cylindrical shape surrounding the piston, the housing further includes an outer cylindrical portion located to surround the guide portion with a spacing to the guide portion outside the guide portion in the radial direction, and the upper outer space is a space defined by an outer circumferential surface of the guide portion and an inner circumferential surface of the outer cylindrical portion.

4. The slewing unit of a construction machine according to claim 1, wherein the at least one supply passage includes a first supply passage including: a guide portion passage that is a passage formed in the guide portion and leading to the upper outer space; and a piston passage that is a passage formed in the piston and connecting the guide portion passage to the upper central space.

5. The slewing unit of a construction machine according to claim 4, further comprising a supporting member disposed between the rotation side brake member and the rotation shaft, the supporting member being located to surround the rotation shaft, the supporting member supporting the rotation side brake member such that the rotation side brake member rotates as the rotation shaft rotates, wherein an inner passage penetrating the supporting member in the up-and-down direction to connect the upper central space to the lower space is further formed in the housing.

6. The slewing unit of a construction machine according to claim 4, wherein
at least one of the guide portion passage and the piston passage includes a portion that is inclined with respect to a horizontal plane to be located downward as the portion approaches the rotation shaft.

7. The slewing unit of a construction machine according to claim 4, further comprising
a biasing member that biases the piston upward,
wherein a pilot oil passage that enables a pilot oil for moving the piston downward against upward biasing force exerted by the biasing member to be supplied toward the piston is formed in the housing, and
the biasing member includes an upper end that transmits the upward biasing force to the piston, and the upper end is located below the piston passage.

8. The slewing unit of a construction machine according to claim 1, wherein
the housing includes:
an intervention member in which the outer passage is formed, the intervention member being interposed between the piston and the speed reducer, the intervention member being located to surround the rotation shaft and the rotation side brake member, the intervention member supporting the housing side brake member; and
an upper cover including the guide portion, the upper cover being disposed above the intervention member and connected to the intervention member.

9. The slewing unit of a construction machine according to claim 8, wherein
the intervention member includes an upper surface, the upper surface includes an outer upper surface portion that is a portion defining a lower portion of the upper outer space, an intermediate upper surface portion that is a portion facing the guide portion in the up-and-down direction, and an inner upper surface portion that is a portion facing the piston in the up-and-down direction, and the at least one supply passage includes a second supply passage including: a guide portion lower passage that is a passage between the intermediate upper surface portion of the intervention member and the guide portion, leading to the upper outer space; and a piston lower passage that is a passage between the inner upper surface portion of the intervention member and the piston, the piston lower passage guiding, inward in the radial direction, the lubricant that has passed through the lower space, the outer passage, the upper outer space, and the guide portion lower passage in this order to supply the lubricant to the plurality of brake members located below the piston.

10. The slewing unit of a construction machine according to claim 9, wherein
at least one of the outer upper surface portion, the intermediate upper surface portion, and the inner upper surface portion of the intervention member includes a portion that is inclined with respect to the horizontal plane to be located downward as the portion approaches the rotation shaft.

11. The slewing unit of a construction machine according to claim 9, wherein the intervention member includes a backflow prevention wall that is a wall located inside an opening of an upper end of the outer passage in the radial direction and outside the guide portion in the radial direction, the backflow prevention wall standing upward from the outer upper surface portion of the intervention member.

12. The slewing unit of a construction machine according to claim 9, wherein
the intervention member includes a receiving surface that receives the plurality of brake members that receives the pressing force by the piston.

13. The slewing unit of a construction machine according to claim 1, further comprising
a seal member disposed between the guide portion and an outer circumferential surface of the piston,
wherein a seal member lubrication passage connecting a space located directly below a lower edge of the outer circumferential surface of the piston to the lower space is further formed in the housing.

* * * * *